US008238666B2

(12) United States Patent
Besley et al.

(10) Patent No.: US 8,238,666 B2
(45) Date of Patent: Aug. 7, 2012

(54) RECOGNITION OF PARAMETERISED SHAPES FROM DOCUMENT IMAGES

(75) Inventors: James Austin Besley, West Ryde (AU); Eric Wai-Shing Chong, Ryde (AU); Khanh Phi Van Doan, Noranda (AU); Steven Richard Irrgang, Caringbah (AU)

(73) Assignee: Canon Kabushiki Kaisha, Tokyo (JP)

( * ) Notice: Subject to any disclaimer, the term of this patent is extended or adjusted under 35 U.S.C. 154(b) by 1287 days.

(21) Appl. No.: 11/946,602

(22) Filed: Nov. 28, 2007

(65) Prior Publication Data

US 2008/0144942 A1 Jun. 19, 2008

(30) Foreign Application Priority Data

Dec. 13, 2006 (AU) ................................ 2006252025

(51) Int. Cl.
*G06K 9/46* (2006.01)
*G06K 9/64* (2006.01)
*G06K 9/68* (2006.01)
*G06K 9/60* (2006.01)
*G06K 9/56* (2006.01)

(52) U.S. Cl. ......... 382/203; 382/218; 382/308; 715/211

(58) Field of Classification Search .......... 382/217–218, 382/307–309, 203–204; 715/211
See application file for complete search history.

(56) References Cited

U.S. PATENT DOCUMENTS

| | | | | |
|---|---|---|---|---|
| 5,425,109 A | * | 6/1995 | Saga et al. .................... 382/187 |
| 5,636,297 A | * | 6/1997 | Eller et al. .................... 382/293 |
| 5,926,568 A | * | 7/1999 | Chaney et al. ................ 382/217 |
| 7,031,526 B2 | * | 4/2006 | Gorbatov et al. ............. 382/202 |
| 7,136,082 B2 | | 11/2006 | Saund et al. |
| 7,139,004 B2 | | 11/2006 | Saund et al. |
| 7,324,691 B2 | * | 1/2008 | Li et al. ......................... 382/181 |
| 7,503,015 B2 | * | 3/2009 | Chen et al. .................... 715/863 |
| 7,904,810 B2 | * | 3/2011 | Chen et al. .................... 715/268 |
| 7,991,233 B2 | * | 8/2011 | Besley et al. ................. 382/199 |
| 2003/0152273 A1 | | 8/2003 | McCormack et al. |
| 2005/0063592 A1 | | 3/2005 | Li et al. |
| 2005/0140679 A1 | | 6/2005 | Kaneda |

(Continued)

FOREIGN PATENT DOCUMENTS

EP 1331591 7/2003

(Continued)

OTHER PUBLICATIONS

An Aug. 11, 2011 Australian Office Action, issued in corresponding Australian Patent Appln. No. 2006-252025.

*Primary Examiner* — Aaron W Carter
(74) *Attorney, Agent, or Firm* — Fitzpatrick, Cella, Harper & Scinto

(57) ABSTRACT

A method (1100) of creating a document comprising a modifiable shape, is disclosed. The method analyzes an image to detect at least a graphical object. The method matches the detected graphical object with at least one of a plurality of predetermined modifiable closed-form non-textual template shapes (e.g., 420) comprising control parameters for modifying the closed-form non-textual template shape in a non-affine manner. The number of control parameters of the predetermined modifiable closed-form non-textual template shape is less than the number of sections making up the modifiable closed-form non-textual template shape. The method creates a document comprising the at least one modifiable closed-form non-textual template shape.

22 Claims, 27 Drawing Sheets

U.S. PATENT DOCUMENTS

| | | | |
|---|---|---|---|
| 2006/0045343 A1* | 3/2006 | Tremblay et al. | 382/186 |
| 2006/0062465 A1 | 3/2006 | Li et al. | |
| 2006/0214937 A1 | 9/2006 | Saund et al. | |
| 2007/0065013 A1 | 3/2007 | Saund et al. | |
| 2008/0143735 A1* | 6/2008 | Besley et al. | 345/582 |
| 2008/0144942 A1* | 6/2008 | Besley et al. | 382/209 |
| 2010/0171754 A1* | 7/2010 | Hatfield et al. | 345/619 |
| 2011/0069890 A1* | 3/2011 | Besley | 382/199 |

FOREIGN PATENT DOCUMENTS

| | | |
|---|---|---|
| EP | 1331592 | 7/2003 |
| EP | 1519300 | 3/2005 |

* cited by examiner

RECOGNITION OF PARAMETERISED SHAPES FROM DOCUMENT IMAGES

CROSS-REFERENCE TO RELATED PATENT APPLICATIONS

This application claims the right of priority under 35 U.S.C. §119 based on Australian Patent Application No. 2006252025, filed 13 Dec. 2006, which is incorporated by reference herein in its entirety as if fully set forth herein.

FIELD OF THE INVENTION

The present invention relates generally to document analysis and, in particular, to a method and apparatus for creating a document, and to a computer program product including a computer readable medium having recorded thereon a computer program for creating a document.

BACKGROUND

The proliferation of scanning technology combined with ever increasing computational processing power has lead to many advances in the area of document analysis systems. These systems may be used to extract semantic information from a scanned document, for example by means of Optical Character Recognition (OCR) technology. This technology is used in a growing number of applications such as automated form reading. Document analysis systems can also be used to improve compression of an electronic representation of the document by selectively using an appropriate compression method depending on the content of each part of a page of the document. Improved document compression lends itself to applications such as archiving and electronic distribution.

A significant proportion of office documents are generated using structured text/graphics editing applications such as Microsoft® Word, Microsoft® Powerpoint®, and the like. In addition to formatted text editing, these text/graphics editing applications include basic figure drawing tools and options. An important class of document analysis applications process a bitmap representation of a document to generate an electronic version of the document that can be viewed and edited using such editing applications. Such document analysis applications will be referred to as "scan-to-editable" document analysis applications.

The figure drawing options in a typical structured text/graphics editing application include freeform line drawing, template shapes and connectors (i.e., dynamic line objects that connect to and/or between template shapes within a document). The text/graphics editing applications may also include colouring, filling, layering and grouping options for sets of objects.

Freeform line drawing can be used to draw open and closed objects with straight or curved sections by defining a set of points along the path of the object. A closed N-point polygon may be drawn by defining an ordered set of vertices. For example, FIG. 1 shows a generalised line polygon 100 including vertices (e.g., 101) which are represented by black squares on the line polygon 100. Freeform drawn objects may be filled or empty, with a range of possible fill options including solid colours, transparency, blends and patterns.

Many commonly used geometric shapes can be created using template shapes. A user may prefer to use a template shape rather than drawing the shape using freeform lines as this option can be faster, more accurate in terms of representation of the desired shape, and easier to edit at a later time. The well known Microsoft® AutoShapes set includes a number of examples of template shapes which can be manipulated within editing environments such as Microsoft® Word and Powerpoint®. Other template shapes may be found in OpenOffice™ editing applications such as the Writer™ and Impress™ applications.

Template shapes are commonly found in office documents, in particular in figures and flow charts. Some example template shapes 405 to 460 are shown in FIG. 4. A range of fill options are generally available including unfilled line objects 405 to 420, solid filled objects of the same colour 425 to 440 or different colour 445 to 460 to the line, transparency, blends or patterned fills, as shown in FIG. 4.

As described above, connectors are dynamic line objects that connect template shapes within a document. Such line objects include straight connectors and elbow connectors. The line objects forming connectors may have arrowheads or other line end effects. When a template shape is edited or moved, any connectors connected to the template shape are updated to match the change and remain connected as is illustrated in FIG. 2. FIG. 2 (*a*) shows three shapes—a rounded rectangle 205, a diamond 215 and a can 225—connected by a straight connector with an arrowhead at both ends 210 and an elbow connector with no end effect 220. FIG. 2 (*b*) shows the same set of shapes 205, 215, 225 and connectors 210 and 220. However the diamond shape 215 has been moved upwards relative to the other shapes 205 and 225. Both of the connectors 210 and 220 have been updated according to this move—the straight connector 210 is now angled and the elbow connector 220 has flipped in direction. FIG. 2(*c*) shows the same set of shapes 205, 210, 225 and connectors 210, 220. However, in FIG. 2(*c*) the diamond 215 has been moved down and right. The connectors 210 and 220 have been updated accordingly, and the elbow connector 220 includes an additional two turns in order to connect the two shapes 215 and 225 without overlap. Examples of line objects forming connectors may be found among the Microsoft® AutoShapes.

In some structured/text editing applications, connectors can only connect to template shapes at a finite set of pre-defined connection points. In general, these pre-defined connection points are located symmetrically and at outward projecting points around the border of a given template shape. FIG. 3 shows a set of unfilled template shapes 301 to 321. Each of the template shapes (e.g., 301) comprises a corresponding set of connection points which are represented as solid boxes located on the boundaries of the template shape. The set of shapes in FIG. 3 include a rectangle (301), round rectangle (302), ellipse (303), triangle (304), parallelogram (305), trapezoid (306), hexagon (307), plus sign (308), star (309), arrow (310), home plate (311), balloon (312), plaque (313), chevron (314), 8-point seal (315), 16-point seal (316), 32-point seal (317), wedge rectangle callout (318), wedge round rectangle callout (319), wedge ellipse callout (320) and wave (321).

Existing scan-to-editable applications tend to be biased towards processing text and tables and typically do not deal effectively with the processing of figures. Such scan-to-editable applications may use optical character recognition (OCR) processing to recognise characters and simple symbols from an image of a document. Many basic scan-to-editable applications simply embed the parts of the image that are not recognised as text or tables as a bitmapped image typically in a compressed format and sometimes at a low resolution. Such basic scan-to-editable applications are clearly disadvantageous to a user as the embedded bitmapped images can not be readily edited using geometric drawing tools, and also the overall file size can be large.

Other applications employ vectorisation methods to find line objects and solid filled objects. The line objects and solid filled objects may be represented as freeform line drawings in the output rather than instances of specific template shapes. This is disadvantageous to the user as specific editing options defined for a template shape will not be available, limiting the usefulness of a corresponding editable electronic version. Such applications also provide less accurate semantic information regarding the content of a document and may therefore be less useful in database applications that rely on this data.

There are a number of existing methods that may be used for the recognition of graphical elements. Some methods recognise entire classes of individual elements or combinations of elements, where different objects recognised as being in the same class are related by an unspecified range of distortions. Such methods are useful for recognising objects which may come in a number of different shapes and unknown distortions (e.g., human face recognition applications). However, these methods do not provide a means of recognising and specifying a particular parametrisation of a pre-defined shape representation for output in an editable document. Other methods recognise particular shapes and specify a limited set of linear transformations but do not deal with the customised combinations of transformations that may be performed on the shapes within a typical template shape library.

A need therefore exists for an improved method of creating an electronic version of a document from a scanned image input.

SUMMARY

According to one aspect of the present invention there is provided a method of creating a document comprising a modifiable shape, the method comprising the steps of:

analysing an image to detect at least a graphical object;

matching the detected graphical object with at least one of a plurality of predetermined modifiable closed-form non-textual template shapes, each said predetermined template shape comprising at least one control parameter for modifying the closed-form non-textual template shape in a non-affine manner, wherein the number of control parameters of the predetermined modifiable closed-form non-textual template shape is less than the number of sections making up the modifiable closed-form non-textual template shape; and creating a document comprising the at least one modifiable closed-form non-textual template shape.

According to another aspect of the present invention there is provided an apparatus for creating a document comprising a modifiable shape, the apparatus comprising:

analysing means for analysing an image to detect at least a graphical object;

matching means for matching the detected graphical object with at least one of a plurality of predetermined modifiable closed-form non-textual template shapes, each said predetermined template shape comprising at least one control parameter for modifying the closed-form non-textual template shape in a non-affine manner, wherein the number of control parameters of the at least one modifiable closed-form non-textual template shape is less than the number of sections making up the at least one modifiable closed-form non-textual template shape; and creation means for creating a document comprising the at least one modifiable closed-form non-textual template shape.

According to still another aspect of the present invention there is provided a computer readable medium, having a program recorded thereon, where the program is configured to make a computer execute a procedure to create a document comprising a modifiable shape, the program comprising:

code for analysing an image to detect at least a graphical object;

code for matching the detected graphical object with at least one of a plurality of predetermined modifiable closed-form non-textual template shape, each said predetermined template shape comprising at least one control parameter for modifying the closed-form non-textual template shape in a non-affine manner, wherein the number of control parameters of the at least one modifiable closed-form non-textual template shape is less than the number of sections making up the at least one modifiable closed-form non-textual template shape; and code for creating a document comprising the at least one modifiable closed-form non-textual template shape.

Other aspects of the invention are also disclosed.

BRIEF DESCRIPTION OF THE DRAWINGS

Some aspects of the prior art and one or more embodiments of the present invention will now be described with reference to the drawings and appendices, in which.

Figure 27A:
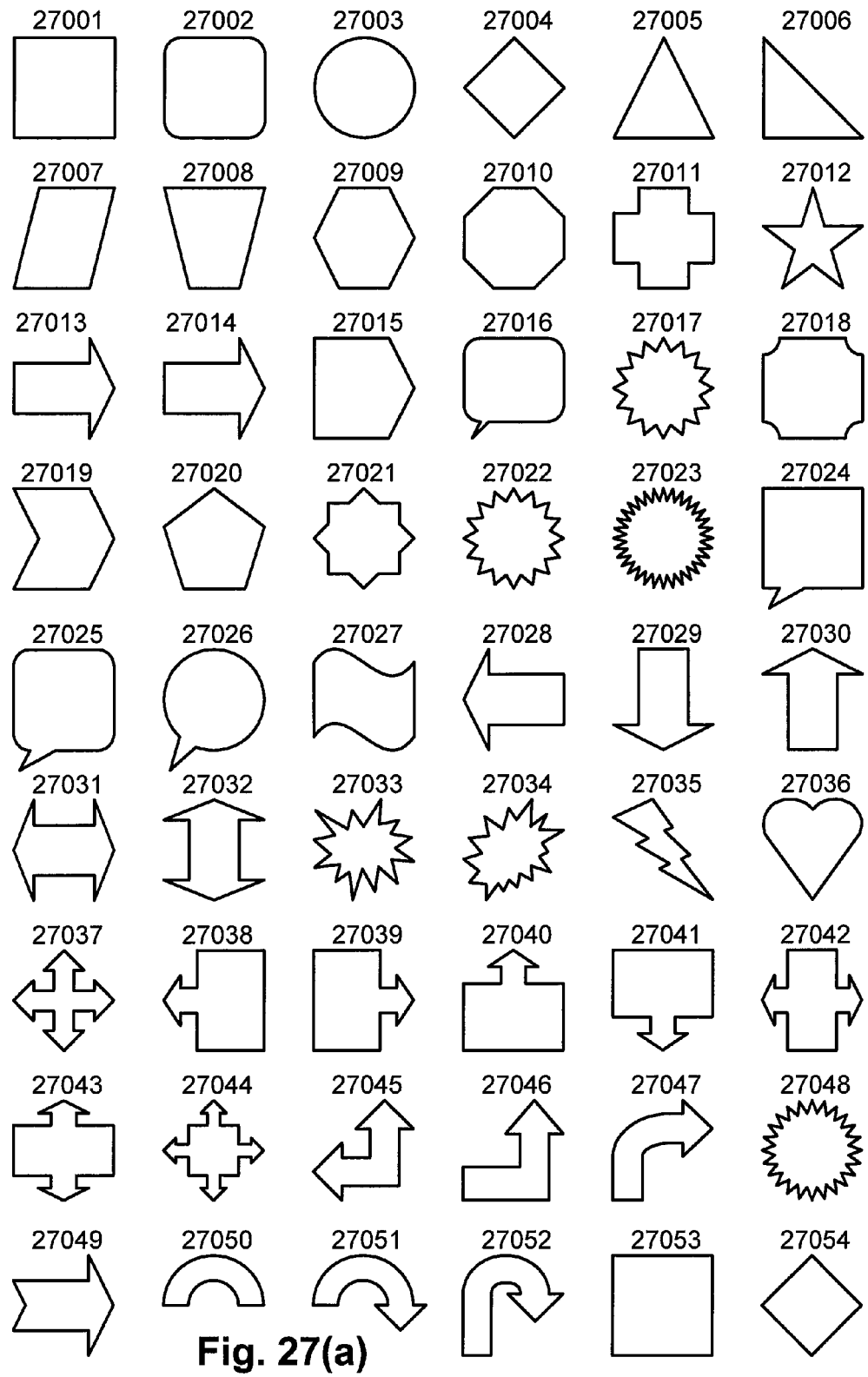
FIGS. 27(a) and (b) show a selection of the Microsoft® Auto Shapes.
Figure 27B:
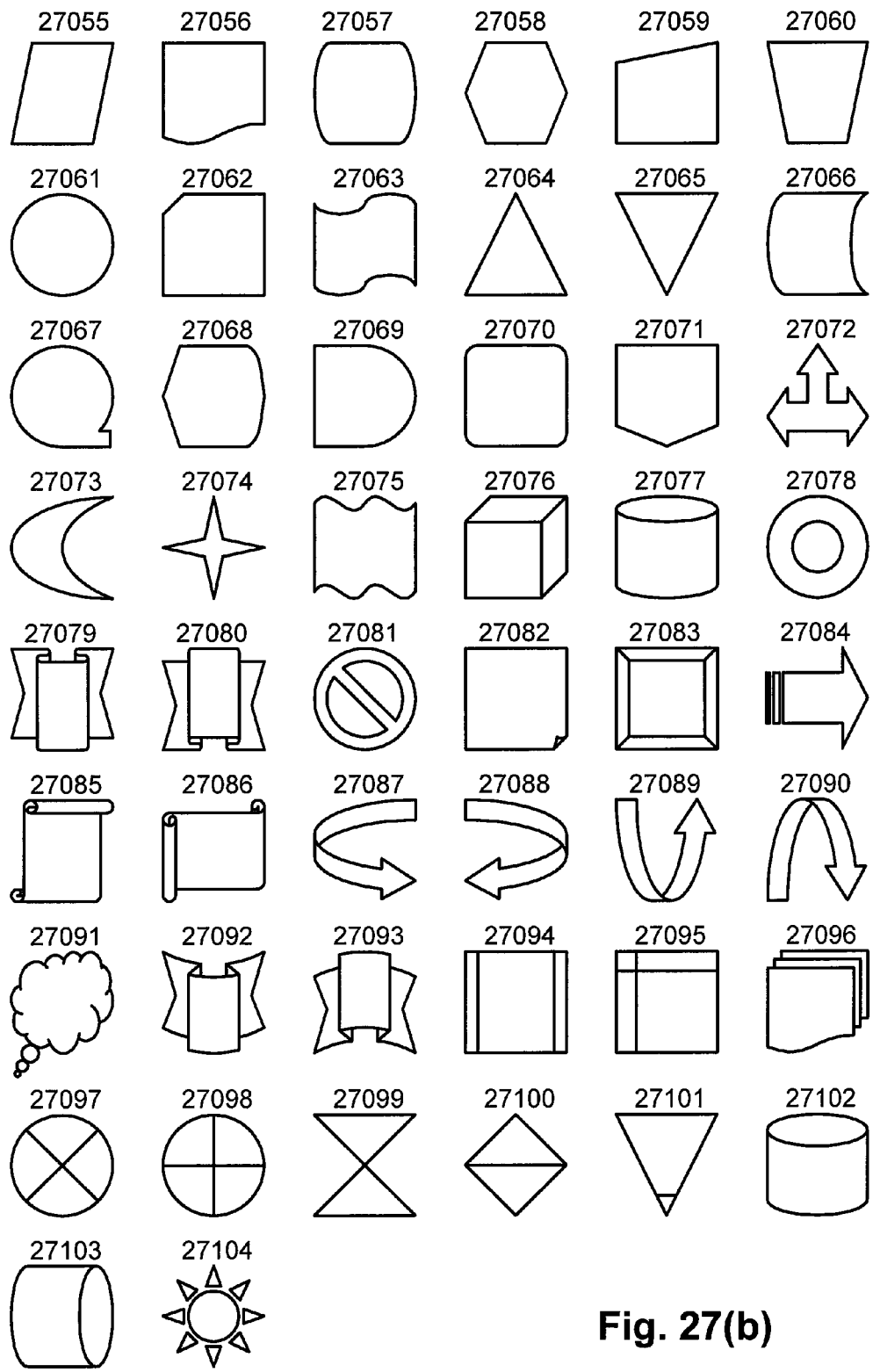

Appendix A is a table listing the names of each of the Microsoft® AutoShapes of FIGS. 27(a) and (b) together with their drawing reference.

DETAILED DESCRIPTION INCLUDING BEST MODE

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which form public knowledge through their respective publication and/or use. Such should not be interpreted as a representation by the present inventor(s) or patent applicant that such documents or devices in any way form part of the common general knowledge in the art.

Methods of creating documents are described below. The described methods may be implemented using a computer system 2500, such as that shown in FIG. 25 wherein the processes of FIGS. 1 to 24 may be implemented as software, such as one or more application programs executable within the computer system 2500. In particular, the steps of the described methods are effected by instructions in the software that are carried out within the computer system 2500. The instructions may be formed as one or more code modules, each for performing one or more particular tasks. The software may also be divided into two separate parts, in which a first part and the corresponding code modules perform the described methods and a second part and the corresponding code modules manage a user interface between the first part and the user. The software may be stored in a computer readable medium, including the storage devices described below, for example. The software is loaded into the computer system 2500 from the computer readable medium, and then executed by the computer system 2500. A computer readable medium having such software or computer program recorded on it is a computer program product. The use of the computer program product in the computer system 2500 preferably effects an advantageous apparatus for implementing the described methods.

Figure 25:
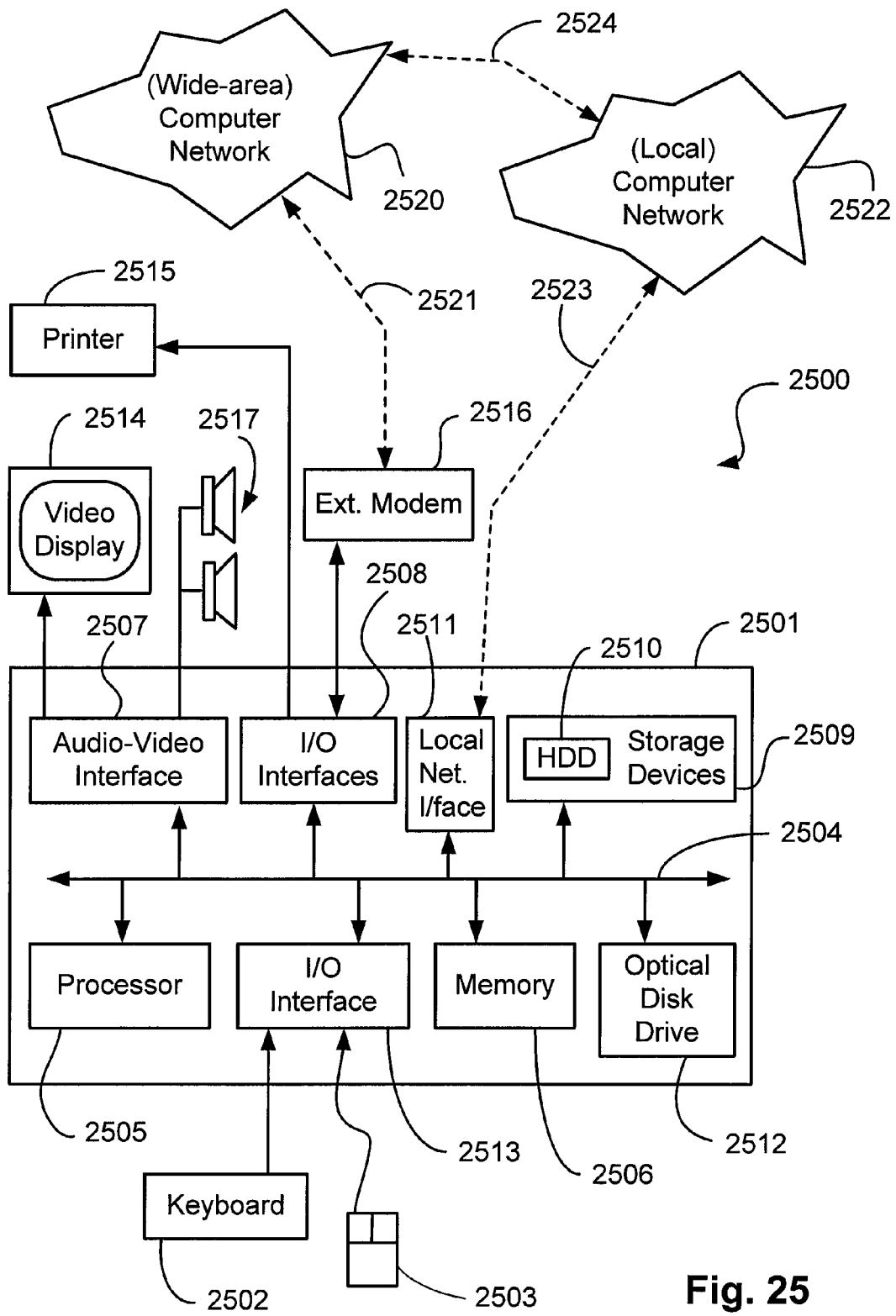
FIG. 25 is a schematic block diagram of a general purpose computer upon which arrangements described can be practiced.

As seen in FIG. 25, the computer system 2500 is formed by a computer module 2501, input devices such as a keyboard 2502 and a mouse pointer device 2503, and output devices including a printer 2515, a display device 2514 and loudspeakers 2517. An external Modulator-Demodulator (Modem) transceiver device 2516 may be used by the computer module 2501 for communicating to and from a communications network 2520 via a connection 2521. The network 2520 may be a wide-area network (WAN), such as the Internet or a private WAN. Where the connection 2521 is a telephone line, the modem 2516 may be a traditional "dial-up" modem. Alternatively, where the connection 2521 is a high capacity (eg: cable) connection, the modem 2516 may be a broadband modem. A wireless modem may also be used for wireless connection to the network 2520.

The computer module 2501 typically includes at least one processor unit 2505, and a memory unit 2506 for example formed from semiconductor random access memory (RAM) and read only memory (ROM). The module 2501 also includes a number of input/output (I/O) interfaces including an audio-video interface 2507 that couples to the video display 2514 and loudspeakers 2517, an I/O interface 2513 for the keyboard 2502 and mouse 2503 and optionally a joystick (not illustrated), and an interface 2508 for the external modem 2516 and printer 2515. In some implementations, the modem 2516 may be incorporated within the computer module 2501, for example within the interface 2508. The computer module 2501 also has a local network interface 2511 which, via a connection 2523, permits coupling of the computer system 2500 to a local computer network 2522, known as a Local Area Network (LAN). As also illustrated, the local network 2522 may also couple to the wide network 2520 via a connection 2524, which would typically include a so-called "firewall" device or similar functionality. The interface 2511 may be formed by an Ethernet circuit card, a wireless Bluetooth® or an IEEE 802.11 wireless arrangement.

The interfaces 2508 and 2513 may afford both serial and parallel connectivity, the former typically being implemented according to the Universal Serial Bus (USB) standards and having corresponding USB connectors (not illustrated). Storage devices 2509 are provided and typically include a hard disk drive (HDD) 2510. Other devices such as a floppy disk drive and a magnetic tape drive (not illustrated) may also be used. An optical disk drive 2512 is typically provided to act as a non-volatile source of data. Portable memory devices, such as optical disks (eg: CD-ROM, DVD), USB-RAM, and floppy disks for example may then be used as appropriate sources of data to the system 2500.

The components 2505 to 2513 of the computer module 2501 typically communicate via an interconnected bus 2504 and in a manner which results in a conventional mode of operation of the computer system 2500 known to those in the relevant art. Examples of computers on which the described arrangements can be practised include IBM-PC's and compatibles, Sun Sparcstations, Apple Mac™ or alike computer systems evolved therefrom.

Typically, the application programs discussed above are resident on the hard disk drive 2510 and read and controlled in execution by the processor 2505. Intermediate storage of such programs and any data fetched from the networks 2520 and 2522 may be accomplished using the semiconductor memory 2506, possibly in concert with the hard disk drive 2510. In some instances, the application programs may be supplied to the user encoded on one or more CD-ROM and read via the corresponding drive 2512, or alternatively may be read by the user from the networks 2520 or 2522. Still further, the software can also be loaded into the computer system 2500 from other computer readable media. Computer readable media refers to any storage medium that participates in providing instructions and/or data to the computer system 2500 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 2501. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 2514. Through manipulation of the keyboard 2502 and the mouse 2503, a user of the computer system 2500 and the application may manipulate the interface to provide controlling commands and/or input to the applications associated with the GUI(s).

The described methods may alternatively be implemented in dedicated hardware such as one or more integrated circuits performing the functions or sub functions of the methods. Such dedicated hardware may include graphic processors, digital signal processors, or one or more microprocessors and associated memories.

The term "template shape" as used below refers to a predetermined model that defines the form of a modifiable non-textual shape object with a closed outer boundary within a specified editing or viewing environment. Accordingly, the template shapes described herein are "modifiable closed-form non-textual template shapes." Many template shapes consist of a single closed outer boundary, although some, such as the "can" template shape 420 shown in FIG. 4, include other internal lines. A template shape is specified by a plurality of parameters the interpretation of which is defined within the model. The plurality of parameters can include affine parameters, control parameters and line thickness parameters. The parameters defining a template shape are described in further detail below.

FIGS. 27(a) and (b) show a selection of Microsoft™ Autoshapes. Further, Appendix A is a Table listing the names of each of the Microsoft™ AutoShapes of FIGS. 27(a) and (b) together with their drawing reference in FIGS. 27(a) and (b).

The affine parameters of the template shape define modifications to the closed-form non-textual template shape. Such modifications may be described by a linear matrix transform. The modifications include scaling, rotation and offset, and for certain shape classes may also include skew. For scaling of $s_x$ and $s_y$ along the x- and y-axes respectively, a rotation of θ, and offsets of Δx and Δy along the x- and y-axes respectively, the linear matrix transform may be represented in accordance with Equation 1 below:

$$A = \begin{pmatrix} \sin\theta & \cos\theta \\ \cos\theta & \sin\theta \end{pmatrix} \cdot \begin{pmatrix} s_x & 0 \\ 0 & s_y \end{pmatrix} = \begin{pmatrix} \Delta x & 0 \\ 0 & \Delta y \end{pmatrix} \quad (1)$$

If the transform also includes a skew, c, the matrix transform may be represented in accordance with Equation 2 below:

$$A = \begin{pmatrix} \sin\theta & \cos\theta \\ \cos\theta & \sin\theta \end{pmatrix} \cdot \begin{pmatrix} s_x & 0 \\ 0 & s_y \end{pmatrix} \begin{pmatrix} 1 & c \\ 0 & 1 \end{pmatrix} = \begin{pmatrix} \Delta x & 0 \\ 0 & \Delta y \end{pmatrix} \quad (2)$$

Figure 1:
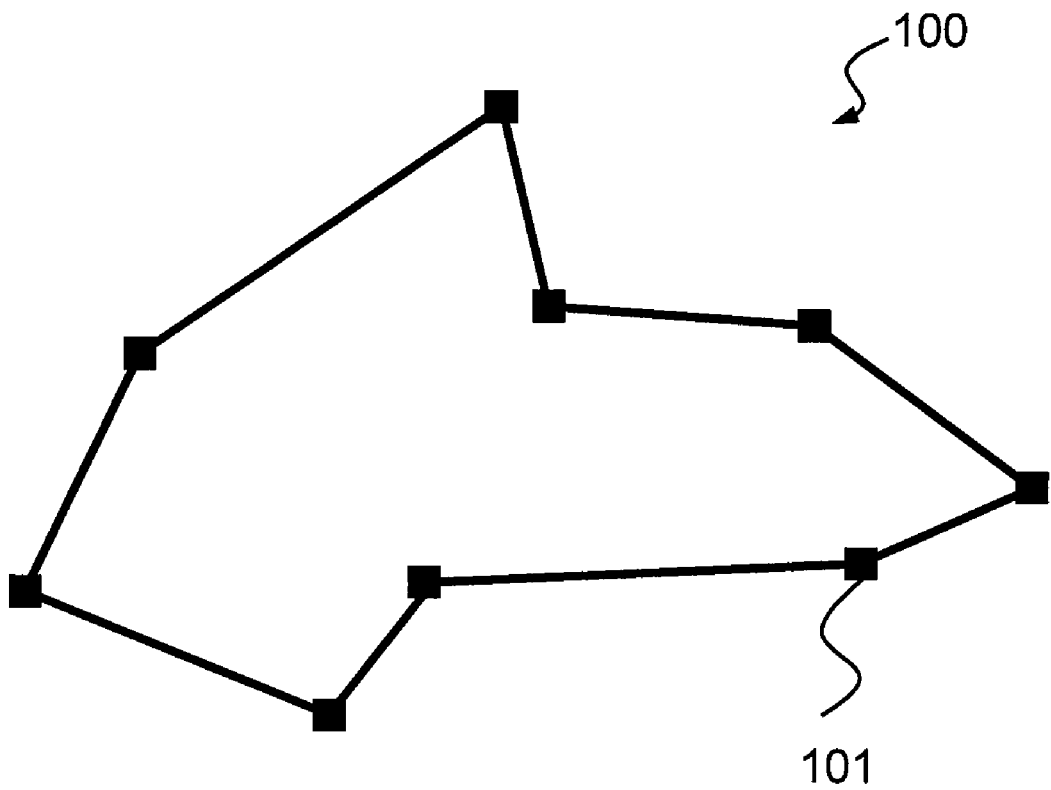
FIG. 1 shows a generalised line polygon.
Figure 2:
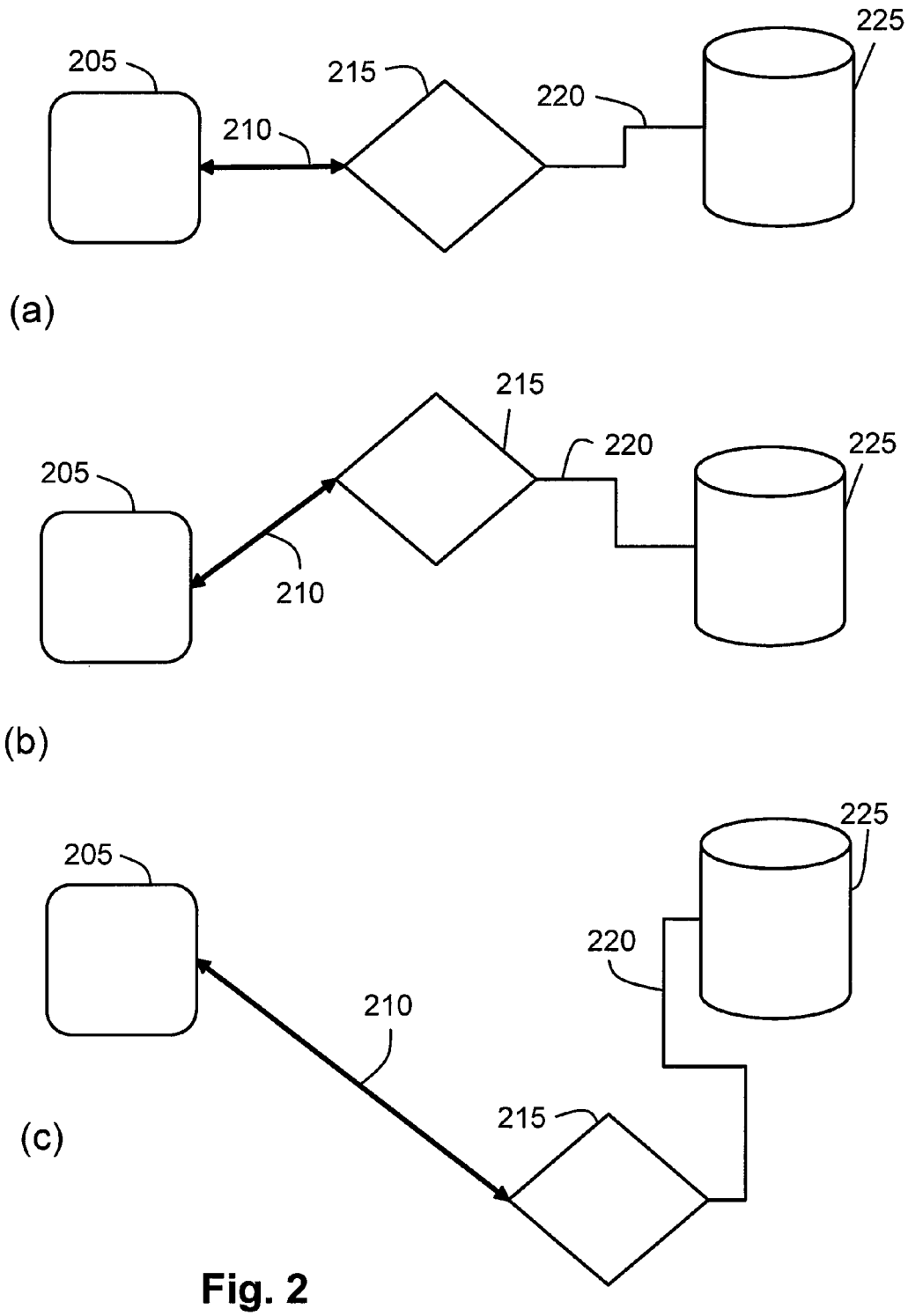
FIG. 2(a) shows a set of template shapes connected by a straight connector and an elbow connector.
FIG. 2(b) shows the same set of template shapes as FIG. 2(a) with one of the template shapes moved.
FIG. 2(c) shows the same set of template shapes as FIG. 2(a) with one of the template shapes moved.
Figure 3:
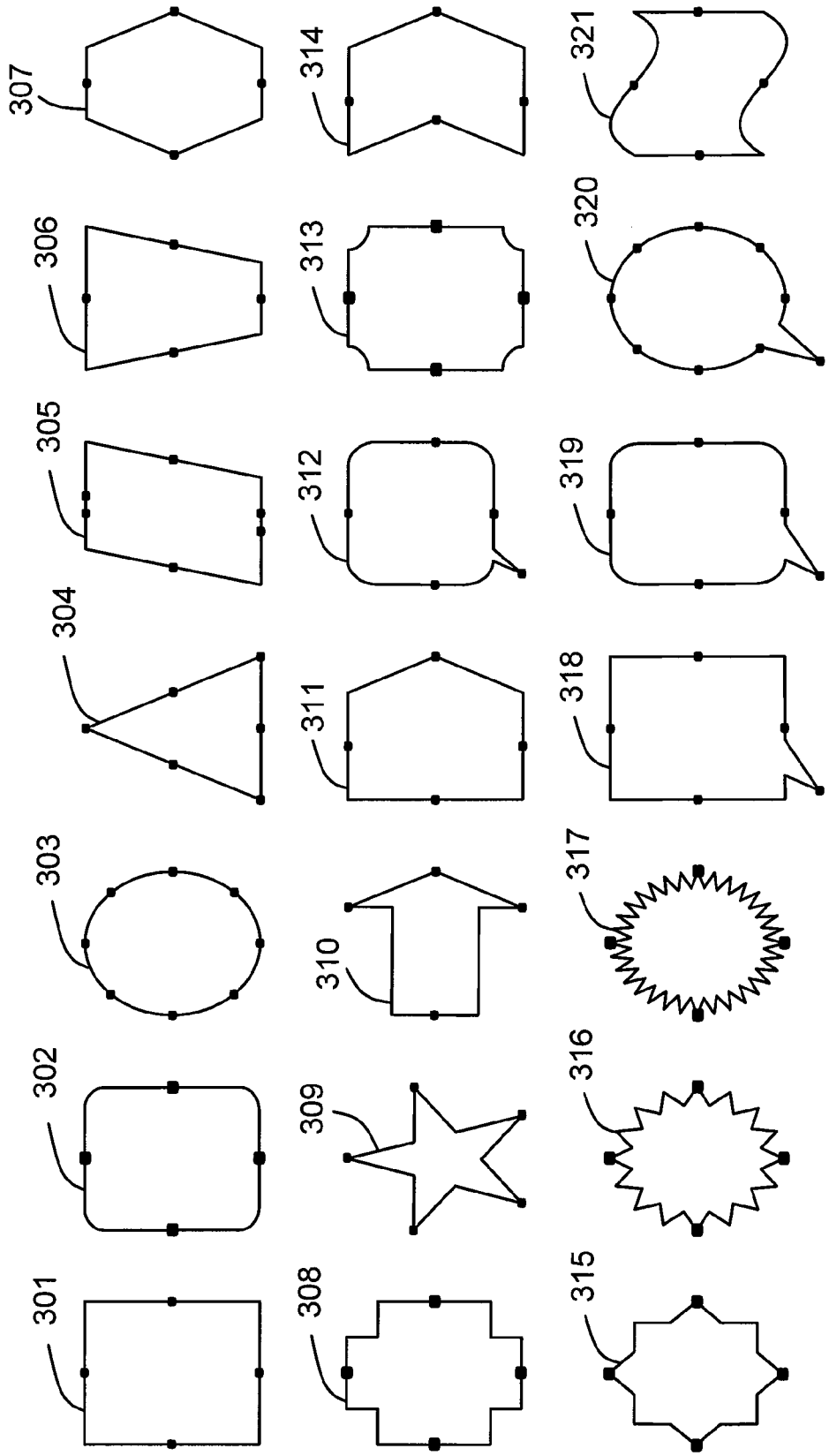
FIG. 3 shows a set of unfilled template shapes.
Figure 4:
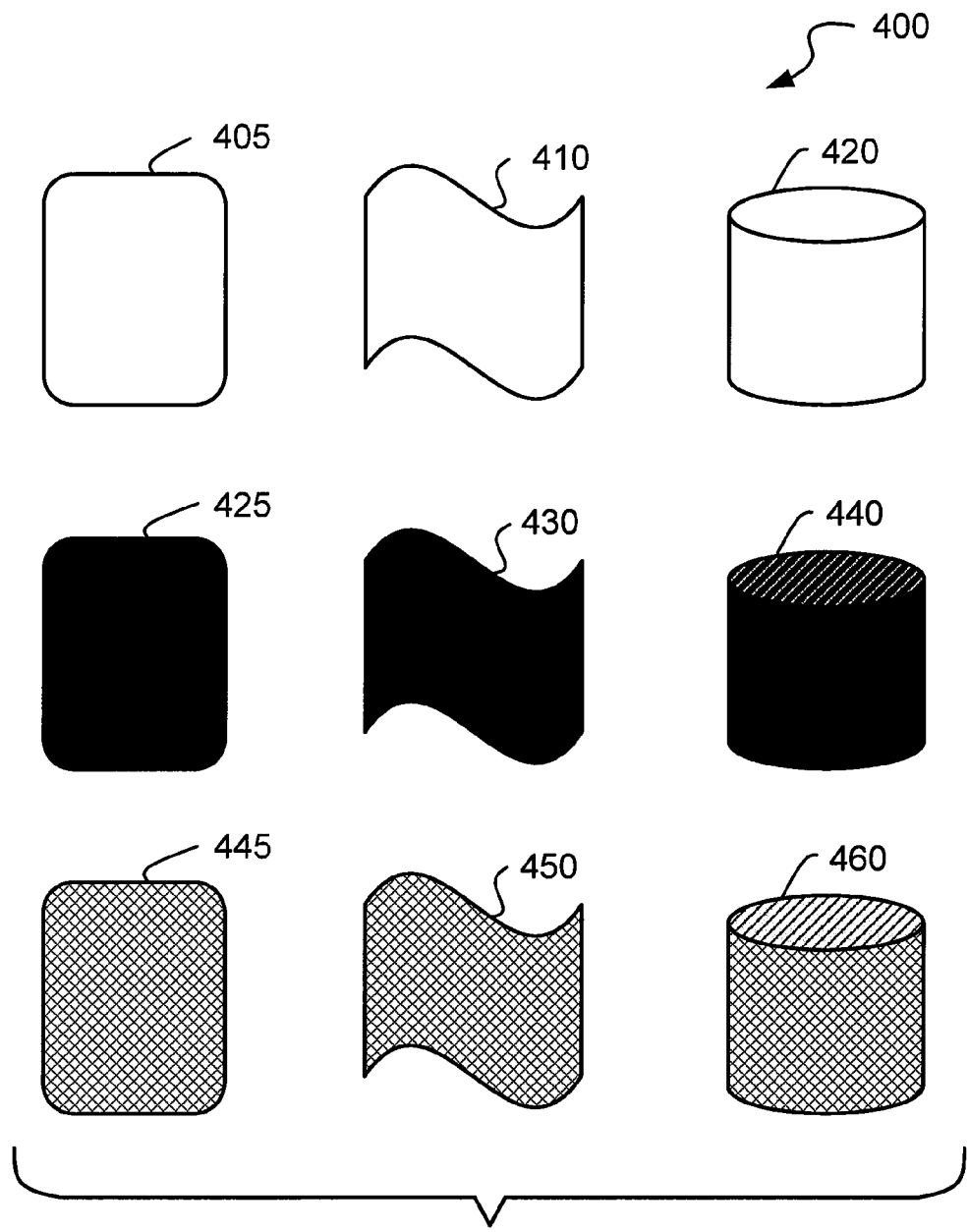
FIG. 4 shows some example template shapes commonly found in documents.
Figure 5A:
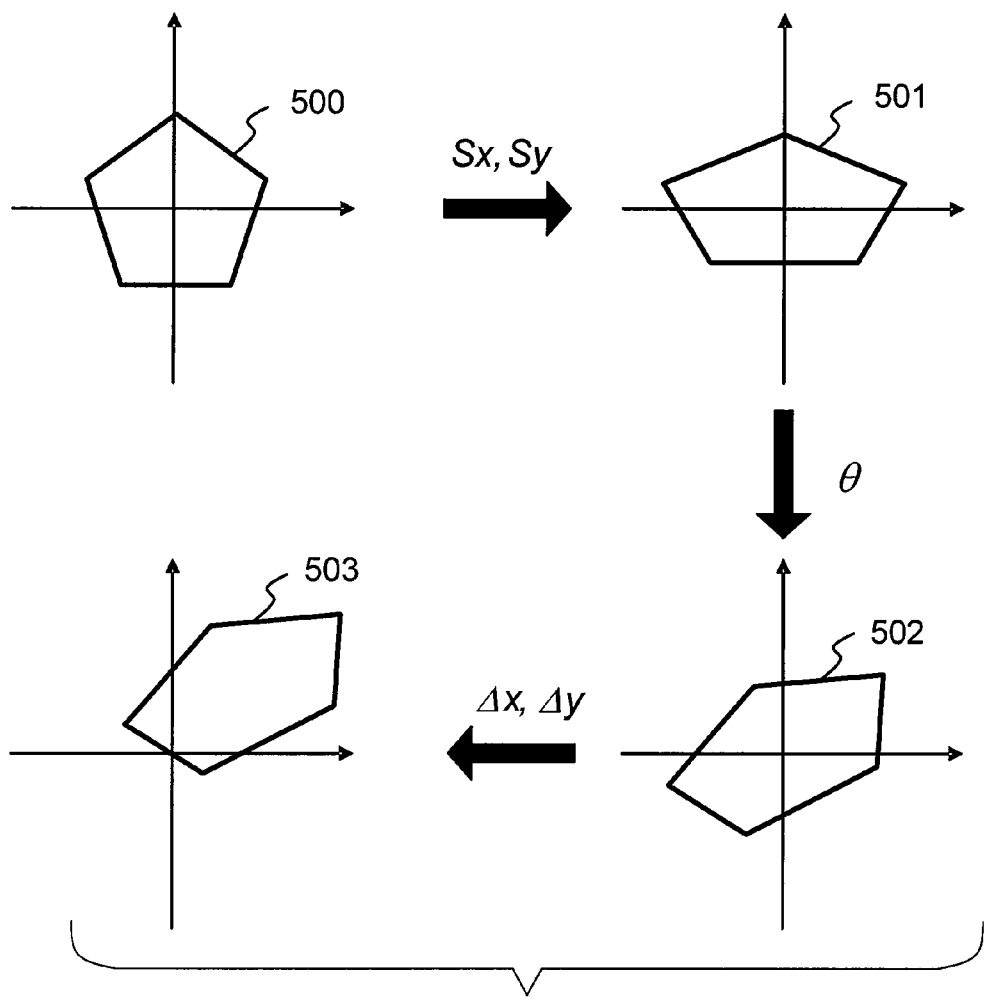
FIG. 5(a) shows a pentagon template shape changing as scaling, $s_x$ and $s_y$, rotation, $\theta$, and offset, $\Delta x$ and $\Delta y$, affine parameters of the template shape are modified.

Objects of the template class that differ only in terms of affine parameters can be modified to match using the appropriate matrix transform. FIG. 5(a) illustrates a pentagon template shape 500 changing firstly to the template shape 501, secondly to the template shape 502 and thirdly to the template shape 503, as scaling, $s_x$ and $s_y$, rotation, θ, and offset, Δx and Δy, affine parameters of the template shape 500 are modified.

Figure 5B:
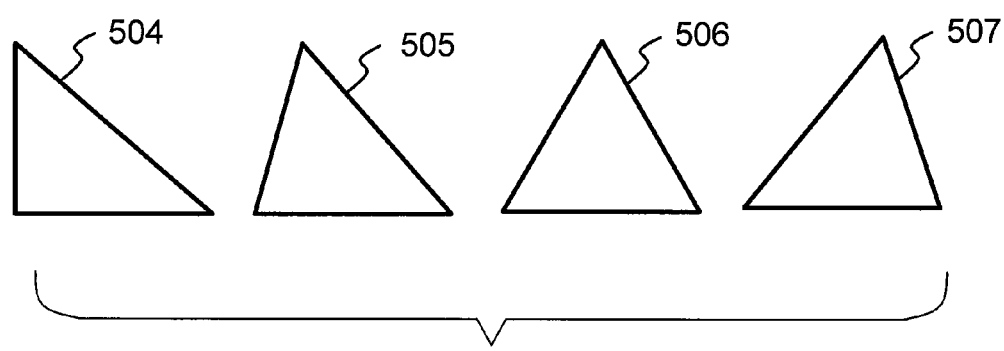
FIG. 5(b) shows a number of different triangles that may be obtained as the skew parameter of a triangle is modified.

FIG. 5(b) shows a number of different triangles 505 to 507 that may be obtained as the skew parameter of the triangle 504 is modified. It is noted that the skew parameter for specific shapes may appear as a control parameter within some user interfaces. However, as described herein, the skew parameter is considered as an affine parameter.

Control parameters define further geometric modifications to the template shape that in general cannot be defined in terms of a linear matrix transform of the template shape. Each template shape has a defined set of N control parameters, where N is specified by the model and may be zero In particular, template shapes typically comprise at most four (4) (i.e., four or less) control parameters. However, some template shapes may comprise more than four control parameters. Template shapes may be defined entirely by straight edges (ie. polygons) or curves, or may comprise a mixture of straight edges and curve sections between a set of vertices. Each control parameter typically modifies a plurality of vertices, a plurality of curve sections, or both a plurality of vertices and curve sections.

A closed-form template shape can alternatively be defined by parameters that denote the coordinates of individual vertices of the particular template shape. Still further, a closed-form template shape can be defined by parameters that independently modify each curve section of the template shape. Commonly used curve parameterisation methods are cubic splines and Bezier curves. The advantage of defining template shapes using control parameters that modify more than one vertice and/or curve sections is that substantially fewer parameters are required, and the parameters describe modifications better suited to that particular shape.

Figure 6:
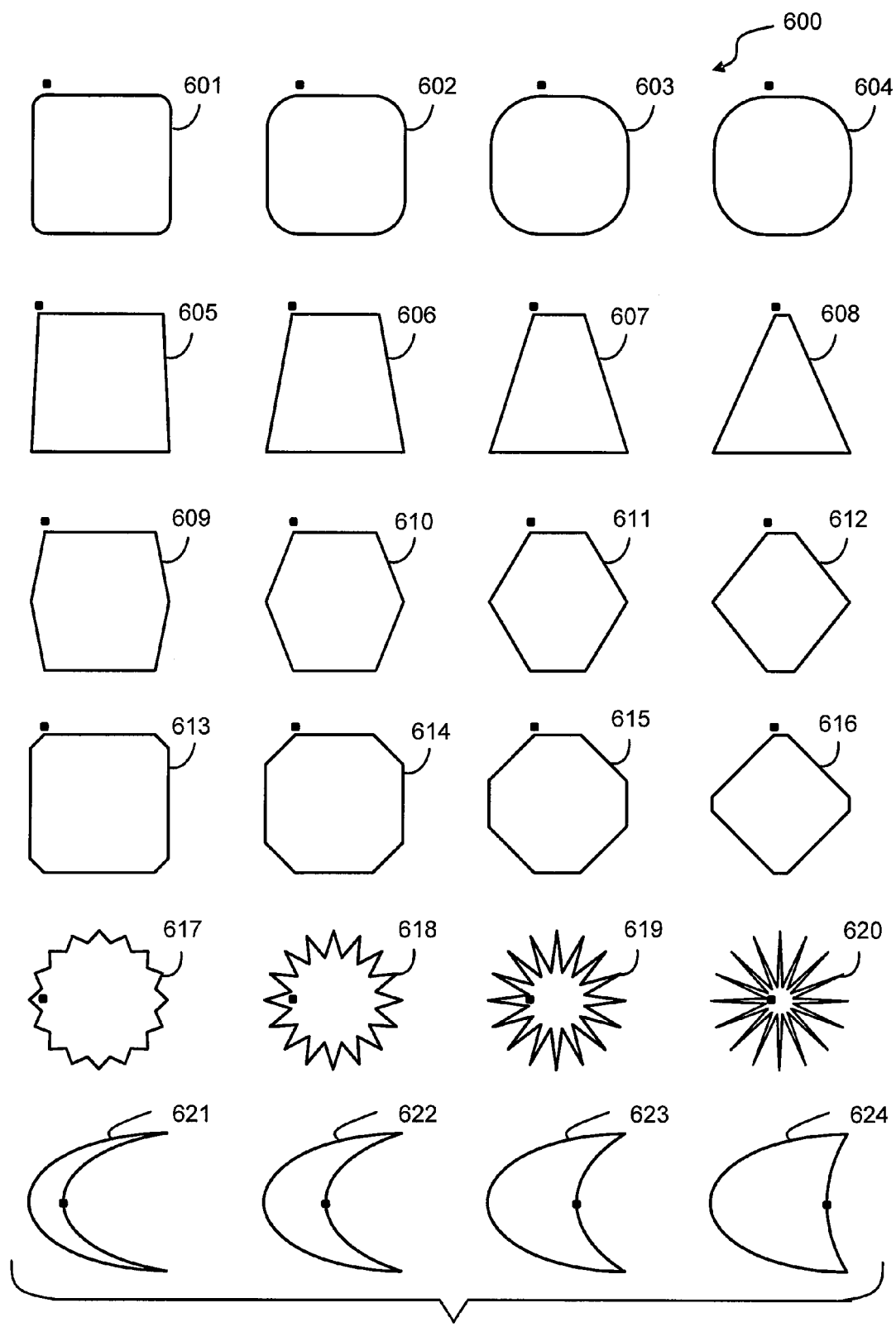
FIG. 6 shows a set of example template shapes with one control parameter.

The effect of modifying the control parameters of a template shape is defined by the template model for the template shape. The control parameters may be used for modifying the closed-form non-textual template shapes in a non-affine manner. A set 600 of example template shapes 601 to 624 with one control parameter are illustrated in FIG. 6. Adjacent to each template shape (e.g., 606) is a black square (e.g., 625), the x-coordinate of which represents the value of the control parameter. FIG. 6 includes a set of round rectangles (i.e., 601 to 604), for which the control parameter modifies the radius of curvature of the corners. FIG. 6 also includes trapezoids (i.e., 605 to 608), hexagons (i.e., 609 to 612) and octagons (i.e., 613 to 616) for which the control parameter (e.g., 625) defines the point of intersection of a line on the left side of the template shape with the upper horizontal section. FIG. 6 also includes 16-point seal (i.e., 617 to 620) for which the control parameter (e.g., 626) defines the relative radii of the convex and concave vertices. Finally, FIG. 6 includes partially occluded moon shapes (i.e., 621 to 624) for which the control parameter (e.g., 627) defines the phase of the moon shape.

Figure 7:
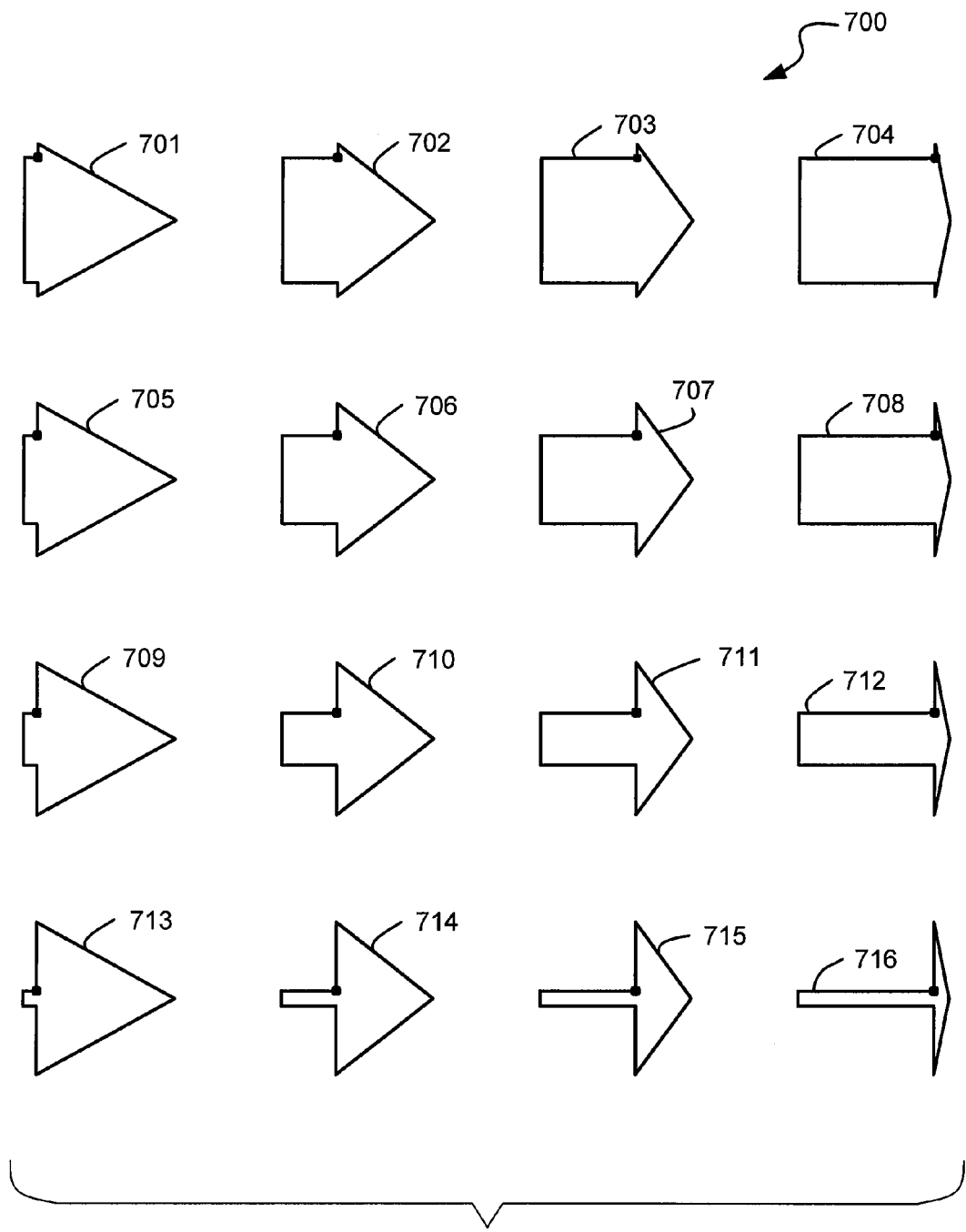
FIG. 7 shows a set of example template shapes with two control parameters.

FIG. 7 shows a set 700 of example template shapes 701 to 716 with two control parameters, namely the arrow. The black squares represent the values of control parameters, in this case the two parameters are represented by the x- and y-coordinates respectively.

Figure 8:
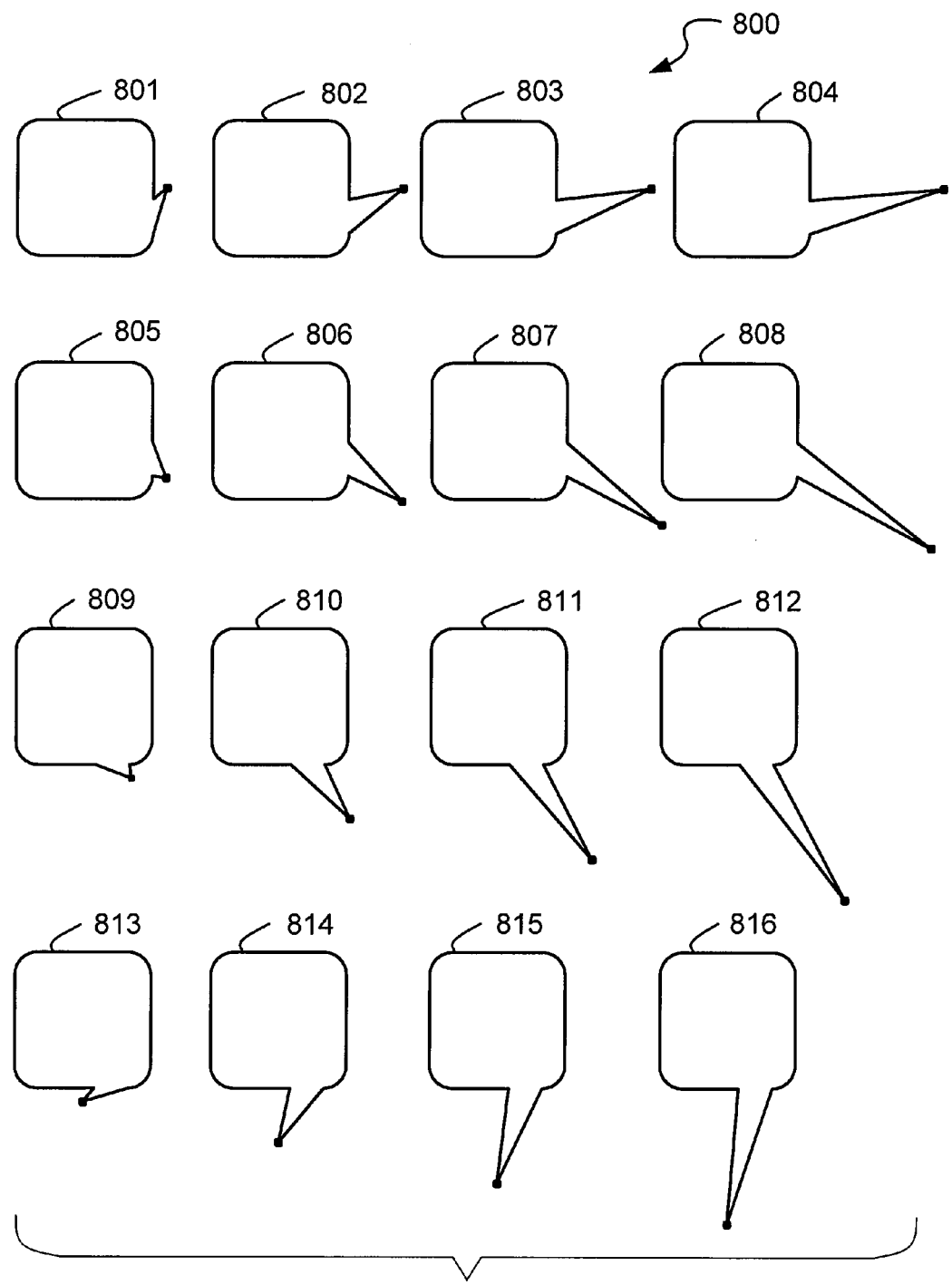
FIG. 8 shows another set of example template shapes with two control parameters.

Similarly, FIG. 8 shows a set 800 of example template shapes 801 to 816 with two control parameters, namely the round callout. Again, the black squares represent the values of control parameters, in this case the two parameters are represented by the x- and y-coordinates respectively.

Template shapes generally have less control parameters than the number of sections that define the outer boundary of the template shape. For example, the set 600 of example shapes in FIG. 6 are defined in terms of a single control parameter. However the trapezoids (605 to 608) consist of four (4) sections, the hexagons (609 to 612) consists of six (6) sections, the octagons (613 to 616) consist of eight (8) sections, the 16-point seals (617 to 620) consist of thirty two (32) sections and the moons (621 to 624) consist of tow (2) sections. Similarly, the template shapes shown in FIGS. 7 and 8 are defined in terms of two (2) control parameters however each template shape consists of more than two (2) sections. Most template shapes in the Microsoft® AutoShapes set have four (4) or less control parameters.

Figure 9:
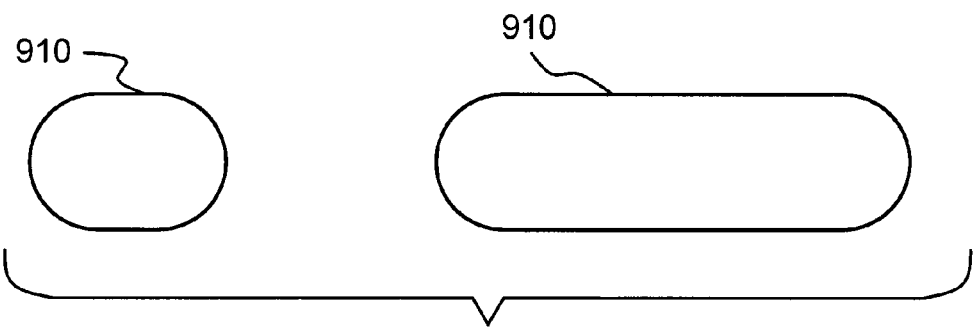
FIG. 9 shows a rounded rectangle template shape as the scaling of the rounded rectangle template shape is modified.

It is noted that in some cases the scaling parameters may not behave as affine parameters for specific template shapes. For example, as seen in FIG. 9, the corners of a rounded rectangle template shape 910 may retain their form as arcs of a circle while the scaling for the rounded rectangle template shape 910 is modified to form the rounded rectangle shape 920, rather than taking an elliptical form as would be expected with an affine scaling. Such behaviour can be modelled by adding an extra control parameter to the template shape corresponding to the aspect ratio (i.e., the ratio between the vertical and horizontal scaling parameters) of the template shape.

Figure 10:
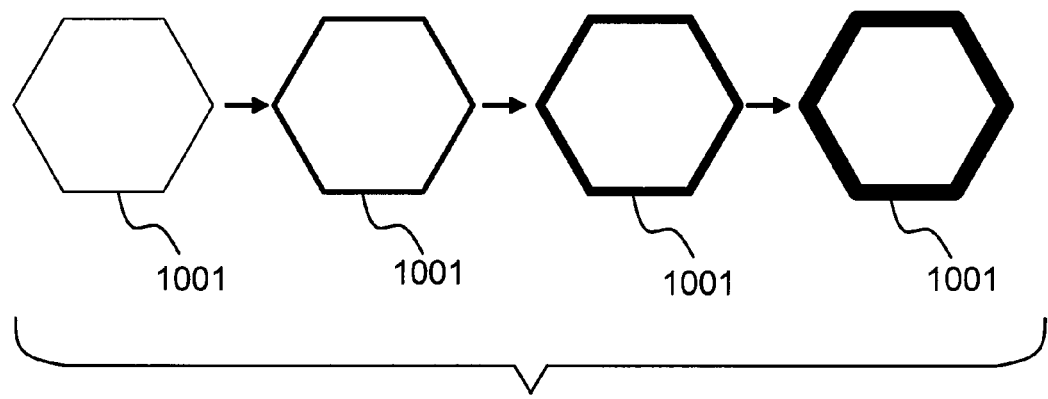
FIG. 10 shows an unfilled hexagon template shape with a set of increasing line thickness parameters from left to right.

Line thickness parameters simply define the thickness of the lines that define a given template shape. In general there is only one line thickness parameter which defines the uniform thickness of the line for the entire template shape. FIG. 10 shows an unfilled hexagon template shape 1001 with a set of increasing line thickness parameters from left to right on the page.

The methods described herein may be implemented using a number of moments, such as the geometric moments, the central geometric moments and the Zernike moments.

The $(p, q)^{th}$ order geometric moments are defined in terms of an integral over the area, A, covered by the interior of a given shape object (e.g., a graphical object) in accordance with Equation 3 as follows:

$$M_{pq} = \int\int_A x^p y^q dx dy \quad (3)$$

where p and q are integers $\geq 0$. The geometric moments may be determined in terms of a boundary line integral for speed. The moment $M_{00}$ represents the area of the shape object and the point $(x_0, y_0) = (M_{10}/M_{00}, M_{01}/M_{00})$ represents its centroid.

Central geometric moments are geometric moments of shape objects, for example, that have been translated such that their centroids are located at the origin in accordance with Equation 4 below:

$$m_{pq} = \int\int_A (x-x_0)^p (y-y_0)^q dx dy. \quad (4)$$

Zernike moments are often used in image processing shape recognition processing. Zernike moments have excellent properties in terms of distinguishing shapes using a small number of terms. Zernike moments are defined in terms of a set of basis functions that are orthogonal over the unit circle. These basic functions are given in accordance with Equation (5) as follows:

$$V_{pq}(r, \theta) = R_{pq}(r) e^{iq\theta}, \quad (5)$$

where:

$$R_{pq}(r) = \sum_{k=0}^{\frac{p-|q|}{2}} S(k, p, q) r^{p-2k}$$

$$S(k, p, q) = \begin{cases} \frac{(-1)^k (p-k)!}{k!\left(\frac{p+|q|}{2}-k\right)!\left(\frac{p-|q|}{2}-k\right)!} & 0 \leq |q| \leq p, (p-|q|) \text{ even} \\ 0 & \text{otherwise} \end{cases}$$

The Zernike moments are determined in accordance with Equation (6) as follows:

$$Z_{pq} = \int\int_{unit\ circle} r dr d\theta V_{pq}(r, \theta) f(r, \theta). \quad (6)$$

The methods described below make use of an alternative representation of a shape object which will be referred to as a "normalised shape object". The normalised shape object is based on the original shape object shifted such that the centroid of the shape object coincides with the origin and modified to reduce the effects of rotation and stretching. The normalisation is preferably represented by an affine transformation. Preferably, the general affine normalisation, which is a series of linear transformations to map an arbitrary two dimensional (2D) shape object to its canonical form, is used to perform the normalisation. Specifically, the original shape object is shifted so that the centroid of the shape object is at the origin, stretched along the x and y axes so that the second order moments become 1 ($m_{20}=m_{02}=1$), rotated by 45 degrees and then stretched again so that the second order moments are again 1 ($m_{20}=m_{02}=1$). Alternative normalisation methods may be used, for example based on the principal axis and bounding box of the original shape object.

The affine normalisation described above may be represented in terms of the following matrix Equation 7, as follows:

$$\begin{pmatrix} x' \\ y' \end{pmatrix} = N \cdot \begin{pmatrix} x - \Delta x \\ y - \Delta y \end{pmatrix}, \quad (7)$$

where $(x, y)^T$ and $(x', y')^T$ define a particular point in the shape object before and after the transform respectively, $(\Delta x, \Delta y)^T$ is the location of the centroid of the original shape object, and the normalisation matrix N is defined in terms of the second order central geometric moments using Equation 8, as follows:

$$N = \begin{pmatrix} \frac{1}{\sqrt{m_{20}}} & \frac{-n_\alpha - n_\beta}{2} & \frac{1}{\sqrt{m_{02}}} & \frac{-n_\alpha - n_\beta}{2} \\ \frac{1}{\sqrt{m_{20}}} & \frac{-n_\alpha - n_\beta}{2} & \frac{1}{\sqrt{m_{02}}} & \frac{-n_\alpha - n_\beta}{2} \end{pmatrix}, \quad (8)$$

where $$n_\alpha = \frac{1}{\sqrt{1 - \frac{m_{11}}{\sqrt{m_{20} m_{02}}}}},$$

$$n_\beta = \frac{1}{\sqrt{1 - \frac{m_{11}}{\sqrt{m_{20} m_{02}}}}}.$$

The methods described below may be used to analyse a bitmap image of a document with graphical regions to generate a document with modifiable template shapes and connectors. Many of the described methods may also be applicable to the analysis of hand-drawn digital ink inputs, for example, in tablet PCs and whiteboard applications. As digital ink inputs are usually stored in vector form, the vectorisation methods described may not be required.

Figure 11:
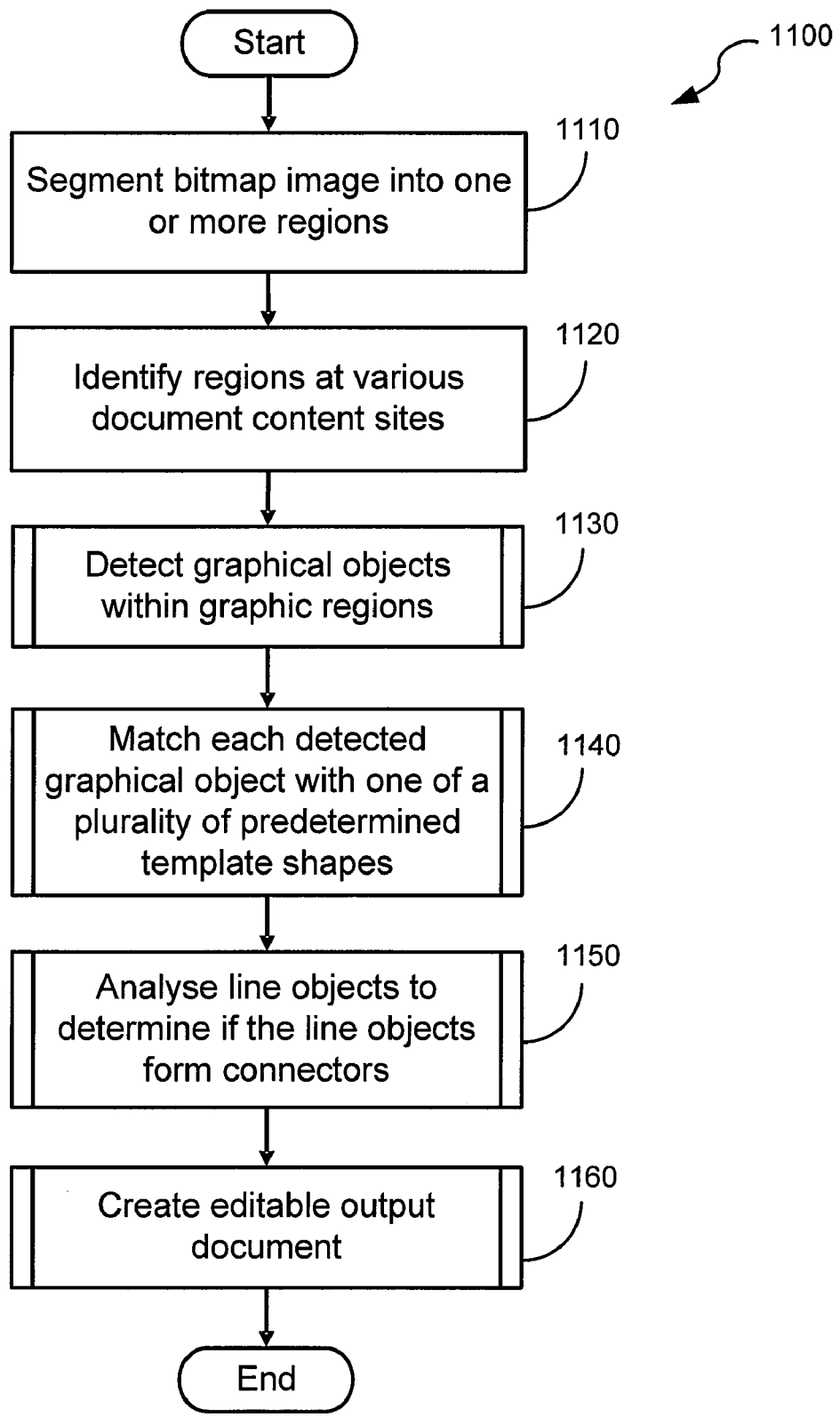
FIG. 11 is a flowchart showing a method of creating a document comprising a modifiable template shape (i.e., a modifiable closed-form non-textual template shape)

FIG. 11 is a flowchart showing a method 1100 of creating a document comprising a modifiable shape (i.e., a closed-form non-textual template shape), according to one embodiment. The method 1100 creates the document by converting an input image with graphical regions into a document with modifiable template shapes and connectors (i.e., dynamic line objects that connect template shapes within a document). The method 1100 may be implemented as software resident on the hard disk drive 2510 and being controlled in its execution by the processor 2505.

As shown in FIG. 11, the method 1100 begins in step 1110, where a bitmap image undergoes a low-level image segmentation. In this manner, the bitmap image is segmented by the processor 2505 into one or more regions according to colour. At the next step 1120, the processor 2505 performs a high-level document layout analysis on the segmented regions of the bitmap image to identify regions of various document content types. In the exemplary embodiment, the regions are rectangular and the content types include the following classifications: text, photographs (halftone) and graphical objects. Each of these content types is made up of pixel data. In alternate embodiments other document content types such as table and line-drawing may be included. The classified regions may also be referred to as zones, blocks or regions of interest. The bounding boxes of the regions may overlap.

Figure 12:
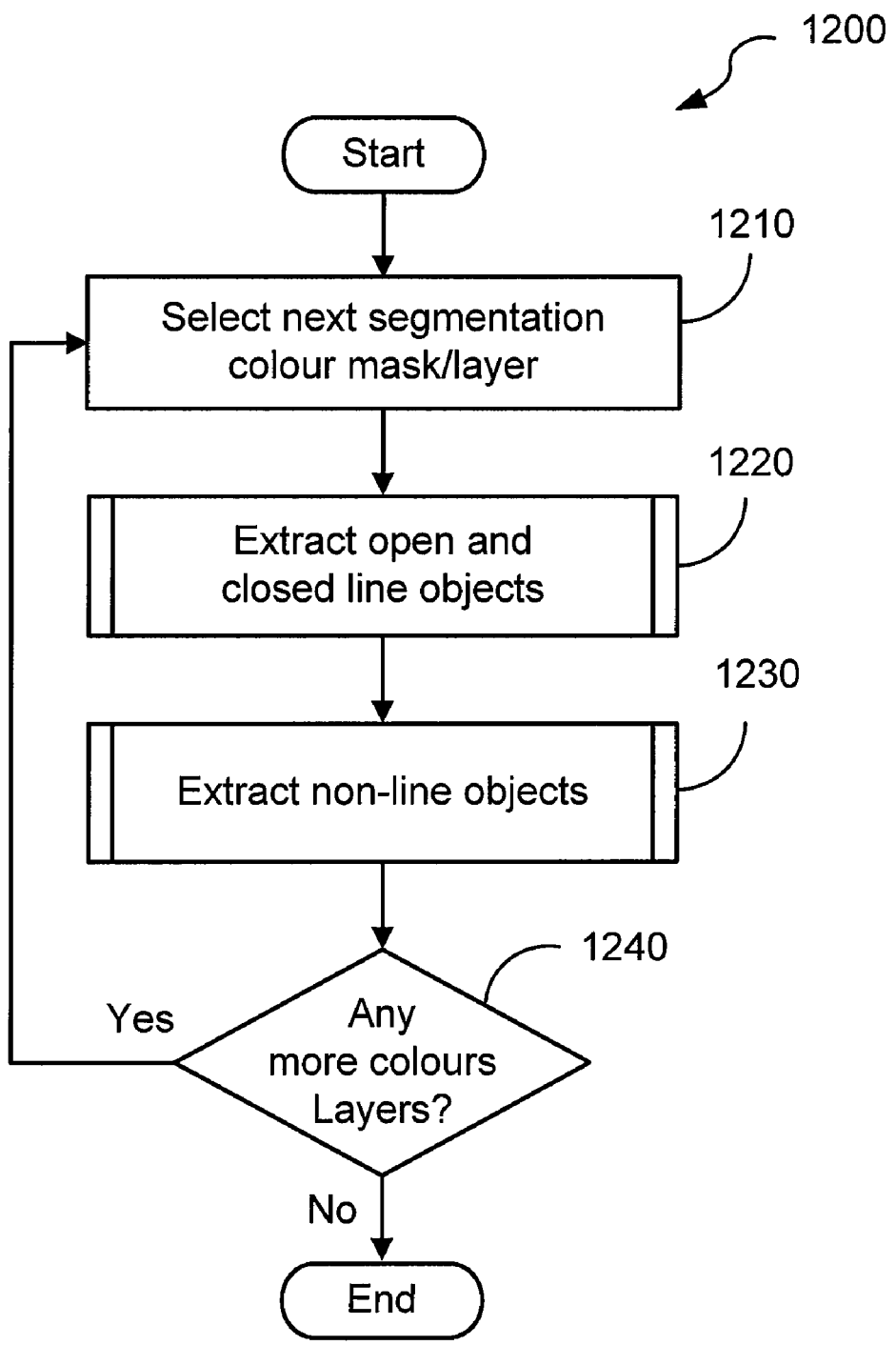
FIG. 12 is a flowchart showing a method of analysing graphics regions to identify (or detect) graphical objects within the graphics regions.

At the next step 1130, the detected graphics regions are further analysed to detect graphical objects within the graphics regions, in accordance with a method 1200 which will be described in more detail below with reference to FIG. 12. Accordingly, at step 1130, the processor 2505 performs the step of analysing graphics regions of the bitmap image to detect bitmap representations of graphical objects and a bitmap representation of a line object.

The method 1100 continues at the next step 1140, where the processor 2505 performs the step of matching each of the detected graphical objects with one of a plurality of predetermined modifiable closed-form non-textual template shapes, as described above, to determine the identities of the individual detected graphical objects. Each template shape may have a finite set of one or more predetermined non-contiguous connection points. As described above, each of the template shapes typically comprises at most four control parameters for modifying the closed-form non-textual template shape in a non-affine manner. The number of control parameters of the predetermined modifiable closed-form non-textual template shape is typically less than the number of sections making up the modifiable closed-form non-textual template shape. A method 1300 of matching a detected graphical object with a predetermined template shape, as executed at step 1140, will be described in detail below with reference to FIG. 13. The output of the method 1300 is one or more candidate template shapes and associated shape parameters.

The method 1100 continues at the next step 1150, where the processor 2505 performs the step of analysing line objects in the graphics regions to determine if the line objects form connectors. The processor 2505 also determines the locations of connection points of the line objects relative to the matched graphical objects. A method 1400 of analysing the line objects, as executed at step 1150, will be described in more detail below with reference to FIG. 14.

At the next step 1160, the processor 2505 performs the step of creating an editable version of the document comprising the matched modifiable closed-form non-textual template shapes with any line objects (or connectors) connected thereto. The editable version of the document also comprises any recognised text, document elements, and the in-painted background. As will be described below, a line object associated with a selected connection point of a template shape in step 1480 (see FIG. 14) remains associated with the selected connection point upon the template shape being modified within the document. As such, the line object remains dynamically connected to the template shape. A method 2000 of creating an editable document comprising the matched closed-form non-textual template shapes, connectors, and other document elements, as executed at step 1160, will be described below with reference to FIG. 20.

The method 1200 of analysing the graphics regions (i.e., as identified in step 1120) to identify (or detect) graphical objects within the graphics regions, as executed at step 1130, will now be described with reference to FIG. 12. The method 1200 may be implemented as software resident on the hard disk drive 2510 and being controlled in its execution by the processor 2505.

The method 1200 employs a loop structure to generate line and solid filled graphical objects from the graphics regions identified in Step 1120.

The method 1200 begins at step 1210, where the processor 2505 selects a segmentation colour mask/layer with graphics regions for processing. Then at the next step 1220, the processor 2505 extracts both open and closed line objects as vectors from the colour layer. An open line object consists of one or more connected line segments with two unconnected ends. A closed line object consists of a number of connected line segments that form a closed polygon. Preferably a line segment is a straight line. In alternate embodiments a line segment may be a curve. A method 1600 of extracting open and closed line objects as vectors from a given segmentation colour mask/layer, as executed at step 1230, will be described in more detail below with reference to FIG. 16.

The colour layer is further processed at step 1230 to extract non-line objects such as filled shapes. The extracted filled shapes are preferably represented as polygon objects. A method 2100 of extracting non-line objects, as executed at step 1230, will be described in more detail below with reference to FIG. 21. At the next step 1240, if there are any more colour layers the method 1200 returns to Step 1210, where the next colour layer is selected and processed. Otherwise, the method 1200 concludes.

Figure 13:
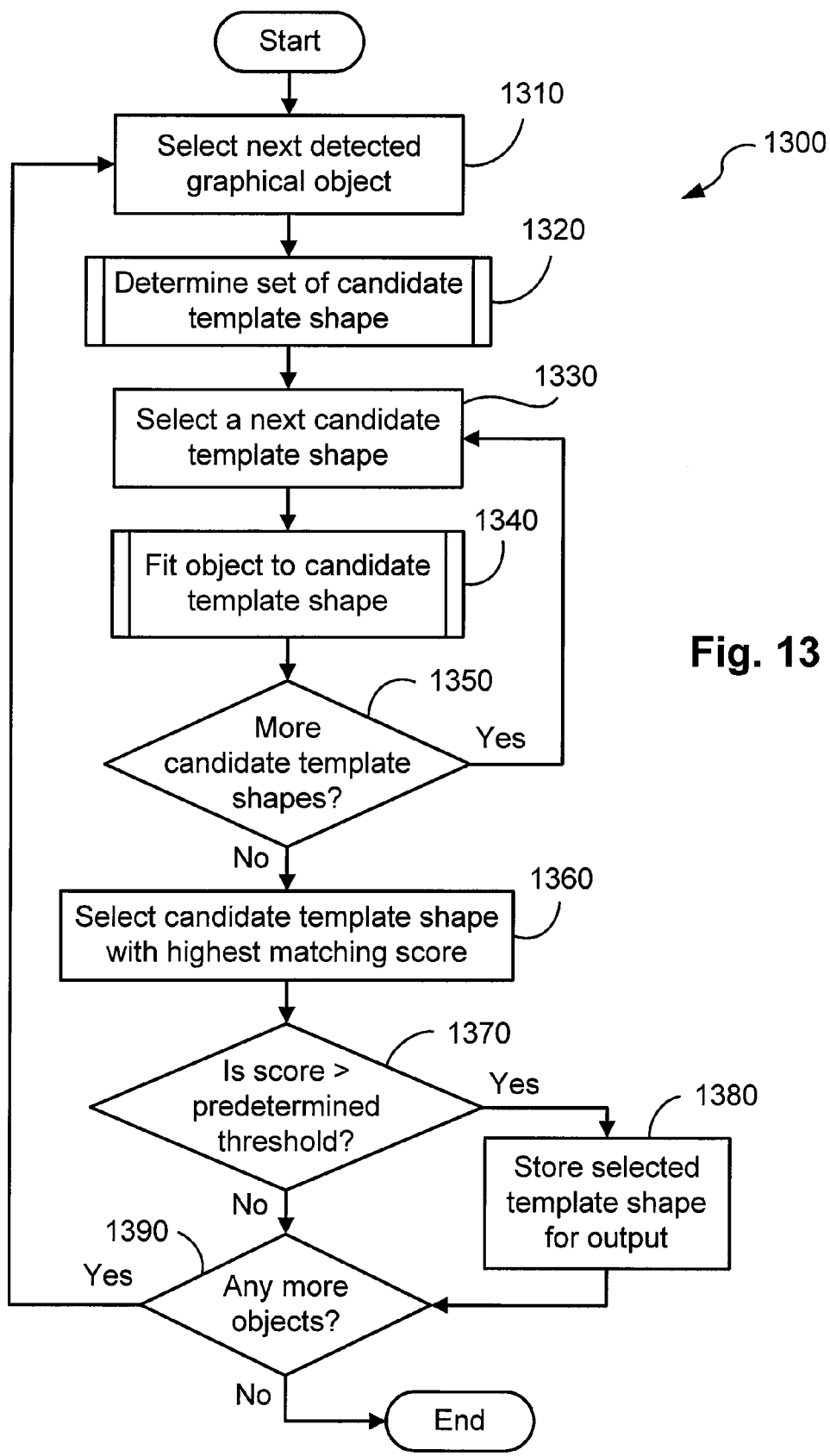
FIG. 13 is a flowchart showing a method of matching a detected graphical object with a predetermined template shape.

The method 1300 of matching a detected graphical object with a predetermined template shape, as executed at step 1140, will now be described with reference to FIG. 13. The method 1300 may be implemented as software resident on the hard disk drive 2510 and being controlled in its execution by the processor 2505. The method 1300 employs a loop structure to select a best matched template shape for each detected graphical object.

The method 1300 begins at step 1310, where the processor 2505 selects a next detected graphical object for processing. Then at the next step 1320, a set of candidate template shapes for the graphical object is determined using a machine learning classifier. A method 1700 of determining a set of candidate template shapes for a graphical object, as executed at step 1320, will be described in more detail below with reference to FIG. 17.

A second loop structure is employed in the method 1300 to process all selected candidate template shapes in turn to find the best matching template shape for the current graphical object. At step 1330 a next candidate template shape is selected, and then in step 1340, the set of shape parameters of the candidate template shape that modifies the candidate template shape to best match the current graphical object and a match score that quantifies how well the graphical object and the modified template shape match each other are determined. A method 1800 of determining a set of parameters for modifying a candidate template shape (i.e., a modifiable closed-form non-textual template shape) to match a graphical object as executed at step 1340 will be described in more detail below with reference to FIG. 18.

From Step 1350, the method 1300 returns to step 1330 if there are more candidate template shapes to be analysed. Otherwise, the method 1300 continues at step 1360, where the candidate template shape with the highest matching score to the current graphical object is selected. Then at step 1370, if that score is greater than a predetermined threshold for shape recognition, then the method 1300 proceeds to step 1380. Preferably, the predetermined threshold is a 95% fitness score (i.e. f>0.95). If the score is greater than the predetermined threshold, the candidate template shape selected at step 1360 with associated shape parameters is stored in memory 2506 for output at step 1380, then the method 1300 continues to step 1390. Otherwise, processing continues directly to step 1390 from step 1370.

At step 1390, if there are any more graphical objects to be processed, then the method 1300 returns to step 1310. Otherwise, the method 1300 is complete.

Figure 14:
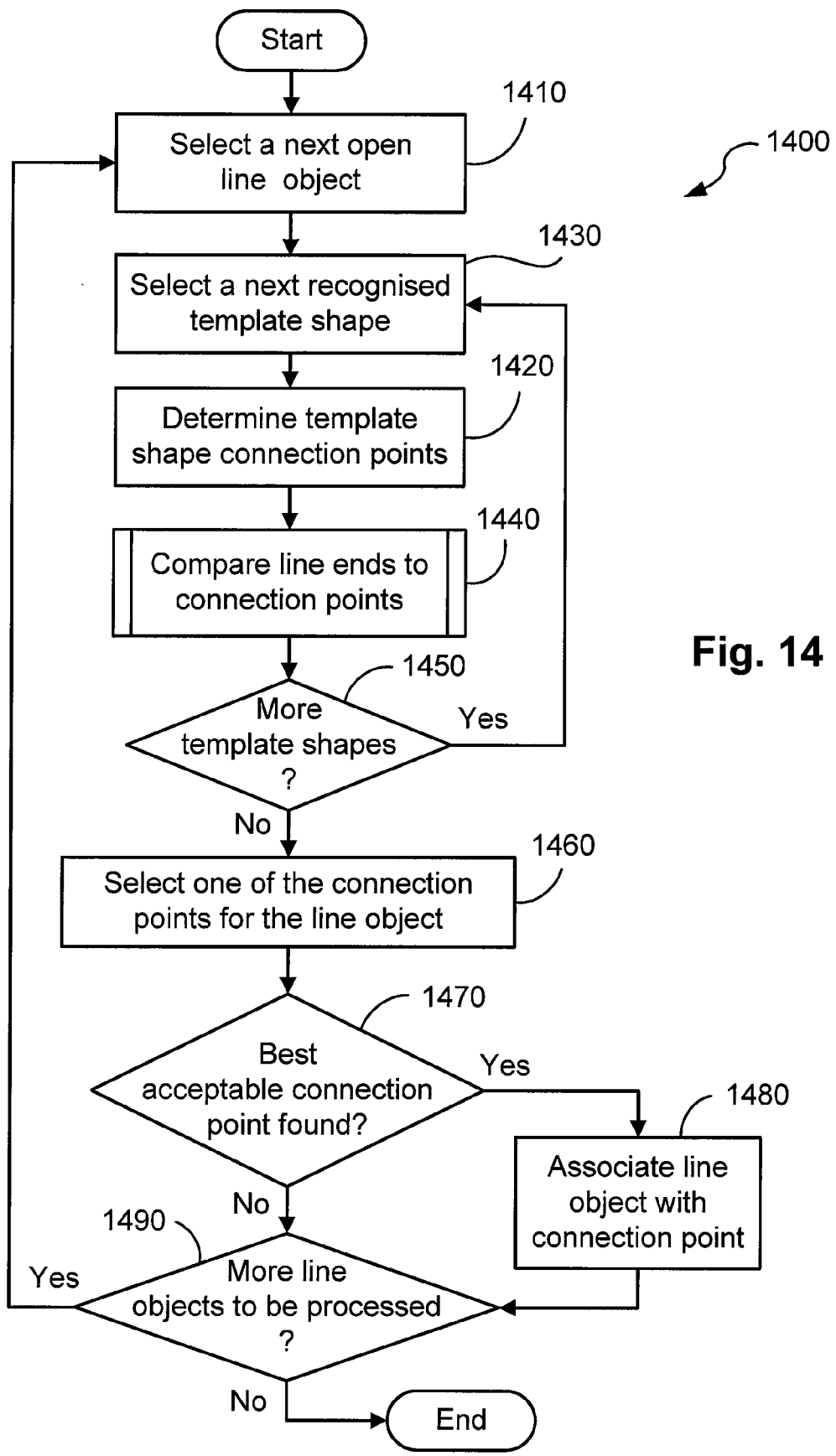
FIG. 14 is a flowchart showing a method of analysing line objects.

The method 1400 of analysing the line objects, as executed at step 1150, will now be described with reference to FIG. 14. The method 1400 may be implemented as software resident on the hard disk drive 2510 and being controlled in its execution by the processor 2505. The method 1400 employs a loop structure to select the best acceptable connection point on a selected template shape for each end of each open line segment.

The method 1400 begins at step 1410, where the processor 2505 selects a next open line object for processing. A second loop structure is employed to process all objects recognised as template shapes in turn to find acceptable connection points for the current open line object. At step 1420, a next template shape is selected, and then at step 1430, a set of predetermined connection points for the selected template shape is determined.

Figure 15:
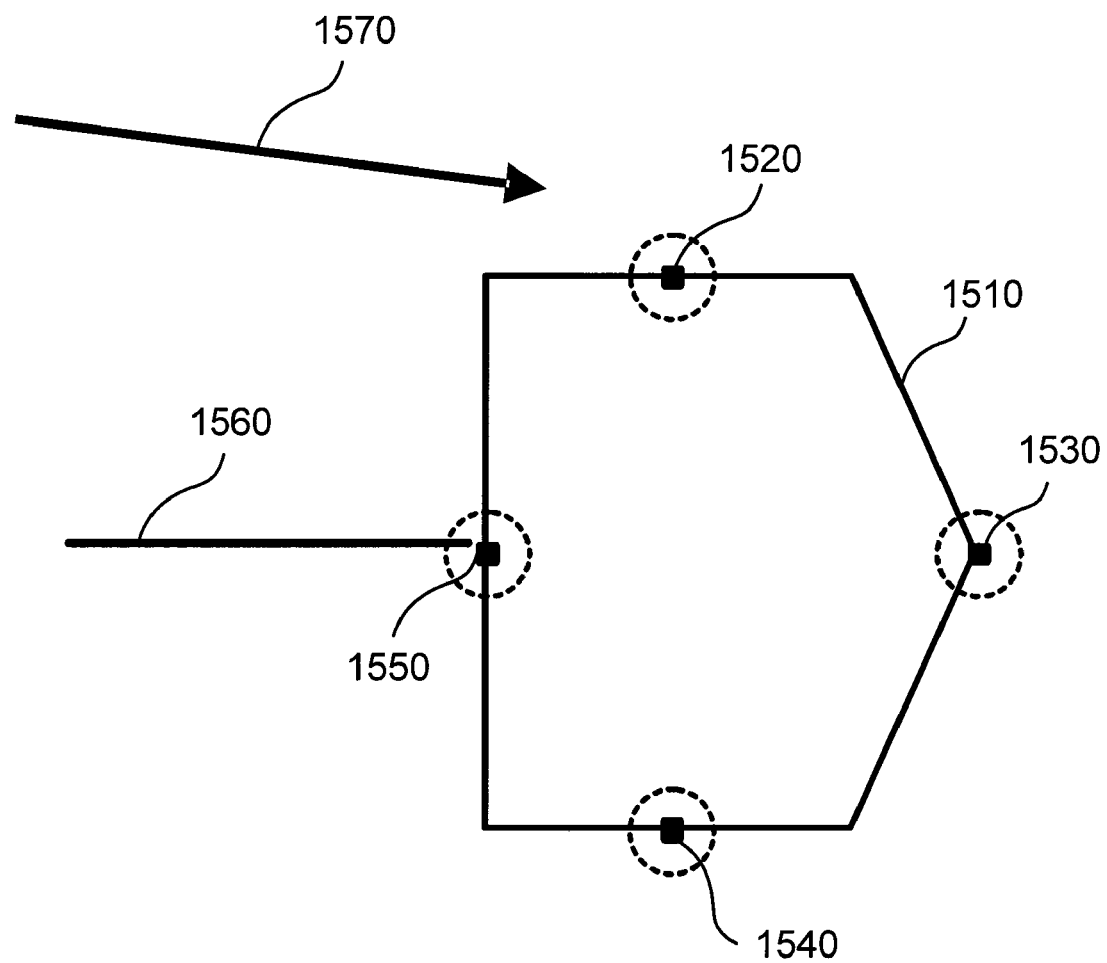
FIG. 15 shows a template shape and two open line objects.

The method 1400 continues at step 1440, where a line end point of the line object is compared with each connection point of the current template shape. In the exemplary embodiment, the distance between the line end point and the connection point is determined and tested against a predetermined threshold distance. The threshold distance may depend on the line thickness, the size of the template shape, and other geometric information relating to the line object and the template shape. In the exemplary embodiment the predetermined threshold distance is given by the smaller of two values given by (i) 30 pt at 300 dpi and (ii) 10% of the smaller of the width and height of the template shape. If the distance between the end of the line object and the template shape connection point is smaller than the predetermined threshold distance then the line object is associated with the connection point in memory 2506. As an example, FIG. 15 shows a template shape 1510, and two open line objects, one with an arrowhead at one end 1570 and one with no end effects 1560. Four connection points for the template shape 1510 have been marked by black squares 1520, 1530, 1540 and 1550. Around each connection point is a dashed circle marking the maximum distance to the end of a line object for an acceptable connection point to be found. In the example of FIG. 15, the right hand end of the line object 1560 has an acceptable connection point 1505, while the other three line ends of the line objects 1560 and 1570 do not have acceptable connection points on the template shape 1510.

From Step 1450, the method 1400 returns to step 1420 if there are more template shapes to be analysed. Otherwise, the method 1400 continues to step 1460. At step 1460, the processor 2505 performs the step of selecting one of the predetermined connection points for the line object if at least one end of the line object is within a predetermined threshold distance of the selected predetermined connection point, as described above. In particular, the best acceptable connection point is selected for the line object, at step 1460. In the exemplary embodiment, the best acceptable connection point is the connection point with the smallest distance between the end of the line object and the connection point.

Step 1470 checks whether a best acceptable connection point has been found for the line object, in which case at the step 1480 the processor 2505 performs the step of associating the line object with the selected connection point. The line object is associated with the selected connection point by storing the line object with a reference to the selected connection point in memory 2506. Otherwise, if a best acceptable connection point has not been found, the method 1400 continues directly to step 1490.

The processor 2505 may also perform the step of classifying the line object at step 1480. In particular, the line object may be classified as a straight connector if the line object consists of a single straight line segment. If the line object consists of a set of straight line segments that are at right angles to each other then the line object may be classified as an elbow connector. Otherwise, any connection points associated with the line object are discarded and the line object is not classified as a dynamic connector.

In the exemplary embodiment, the classification of elbow connectors is based on the AutoShape library elbow connector, as will now be described below. The line object should consist of between two (2) and five (5) straight line segments each of which is approximately parallel to the x- or y-axis of the image. A modified line object is formed that represents a fitting of the original line object to an elbow connector with these properties. If the original line object consists of n line sections defined by (n+1) points then the modified line object also consists of n line sections defined by (n+1) points. The points in the original line object will be referred to as $(x_i, y_i)$ and those in the modified line object will be referred to as $(x'_i, y'_i)$, where i takes integer values from 1 to (n+1).

A first section of the line object is classified as horizontal if the magnitude of the displacement along the x-axis is greater than the magnitude of the vertical displacement over the section. Otherwise, the first section of the line object is classified as vertical. Subsequent sections of the line object are classified as horizontal and vertical in sequence such that no pair of adjacent sections has the same classification. The first point of the modified line object is set to match the first point in the line object (i.e. $(x'_1, y'_1) = (x_1, y_1)$). Each of the sections of the line object is then processed in turn to add a new point to the modified line object. If the $i^{th}$ section is classified as horizontal, then the $(i+1)^{th}$ modified point is set to $(x'_{i+1}, y'_{i+1}) = (x_{i+1}, y'_i)$ unless $i = (n-1)$ in which case the $(i+1)^{th}$ modified point is set to $(x'_{i+1}, y'_{i+1}) = (x_{n+1}, y'_i)$. Likewise, if the $i^{th}$ section is classified as vertical, then the $(i+1)^{th}$ modified point is set to $(x'_{i+1}, y'_{i+1}) = (x'_i, y_{i+1})$ unless $i = (n-1)$ in which case the $(i+1)^{th}$ modified point is set to $(x'_{i+1}, y'_{i+1}) = (x'_i, y_{n+1})$.

The modified line object is tested by comparing corresponding pairs of vertex points from the modified and original line object as follows. The Euclidean distance between the modified and original line points is determined and stored to define a set of modified line point errors. If the maximum value of the line point errors is less than a threshold value then the line object is classified as an elbow connector. In this case, the line object is classified as an elbow connector and the set of modified line points are used to define the parameters of the connector. In the exemplary embodiment, the value of the threshold parameter is given by ten (10) points at 300 dpi.

Figure 26:
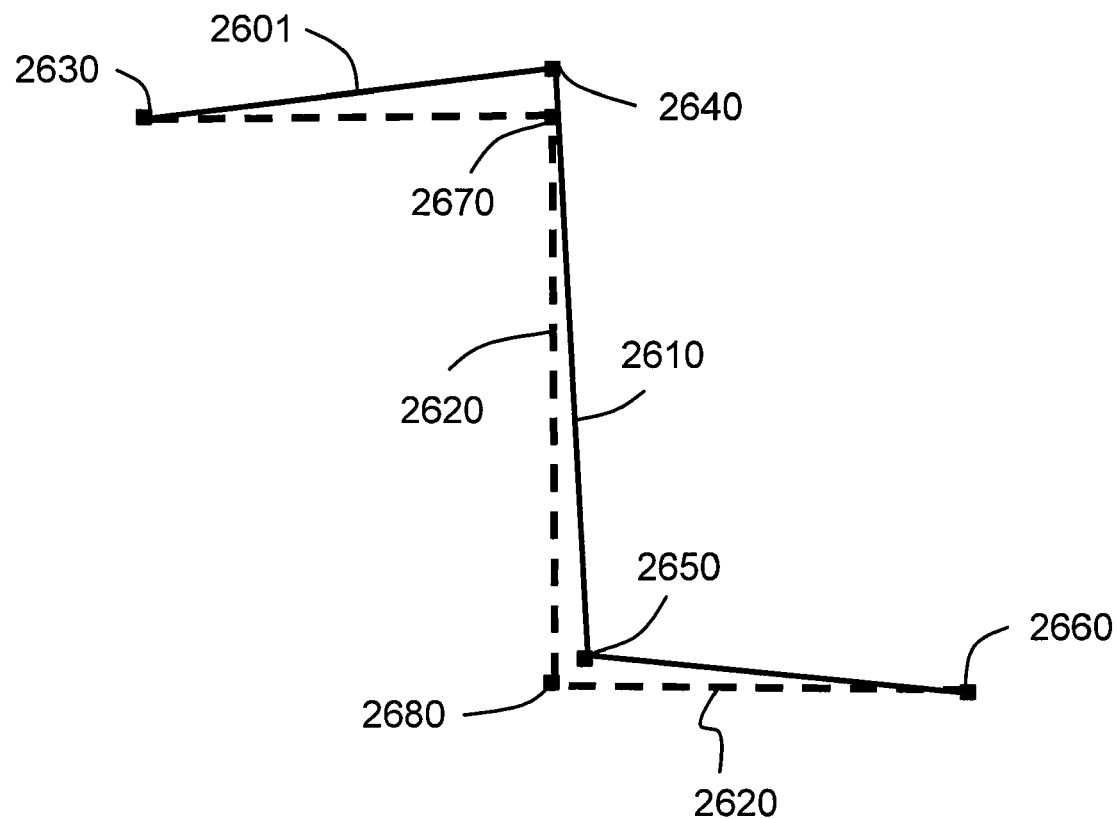
FIG. 26 shows an example of elbow connector classifications.

The classification of an elbow connector as described above will now be further described by way of example with reference to FIG. 26. FIG. 26 shows a line object 2610 consisting of three (3) sections (e.g., 2601) defined by four points (2630, 2640, 2650 and 2660). The corresponding modified line object 2620 is represented by a dashed line, consisting of three (3) sections defined by four points (2630, 2670, 2680 and 2660). The first point 2630 and last point 2660 of the line object 2610 and the modified line object 2620 are identical. The first section of the line object 2610 (i.e., from point 2630 to 2640) is classified as horizontal and so the second point 2670 of the modified line object 2620 is defined with the same x-coordinate as point 2640 and the same y-coordinate as point 2630. The second section of the line object 2610 (i.e., from point 2640 to 2650) is vertical and is the penultimate section and so point 2680 of the modified line object 2620 is defined with the same x-coordinate as point 2670 and the same y-coordinate as point 2660. The distances between points 2640 and 2670 and between points 2650 and 2680 are determined in order to determine whether the modified line object 2620 can be classified as an elbow connector. At step 1490, if the processor 2505 determines that there are more open line objects to be processed, then the method 1400 returns to step 1410. Otherwise, the method 1400 concludes.

Figure 16:
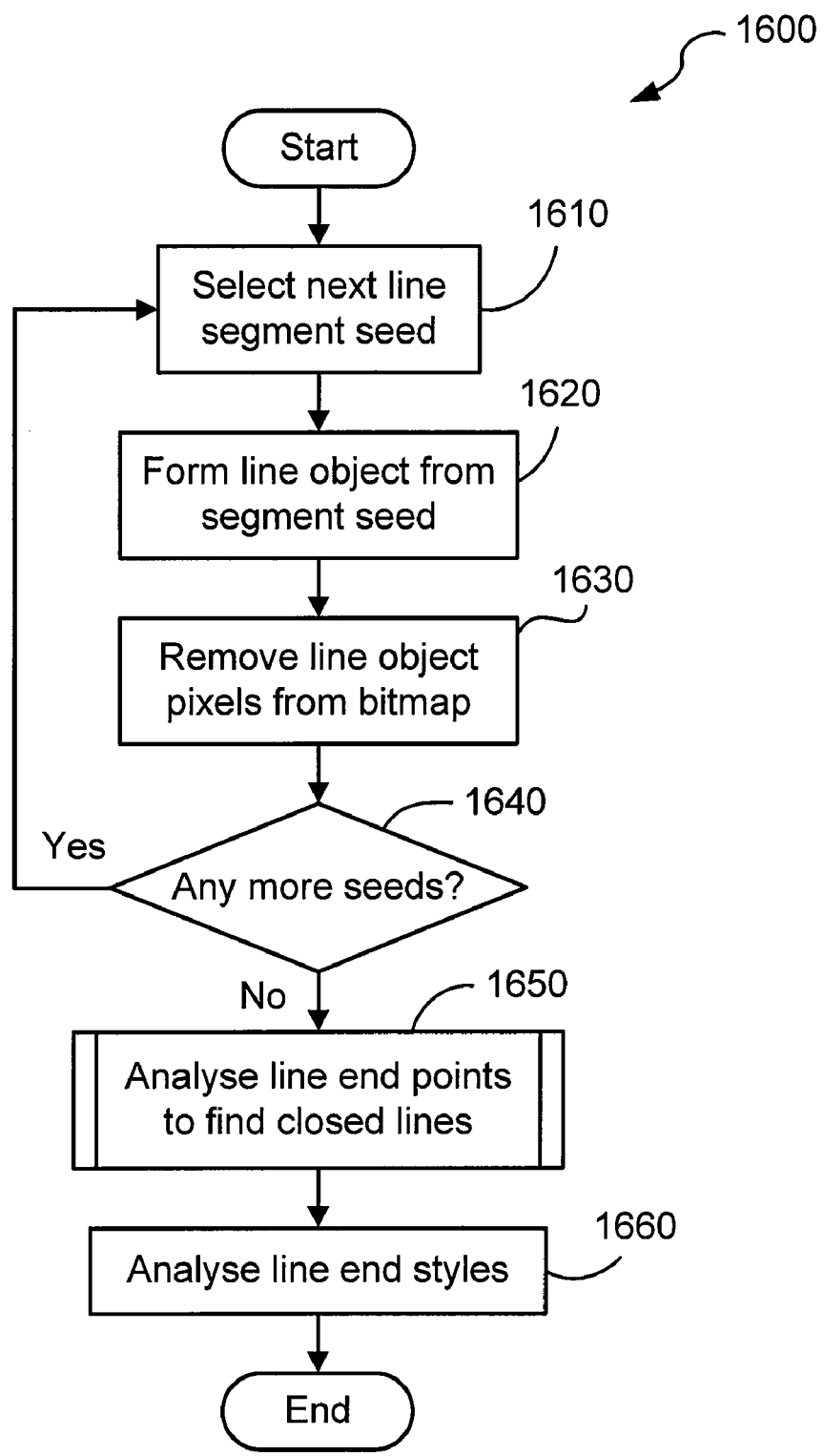
FIG. 16 is a flowchart showing a method of extracting open and closed line objects as vectors from a given segmentation colour mask/layer.

The method 1600 of extracting open and closed line objects as vectors from a given segmentation colour mask/layer, as executed at step 1230, will now be described with reference to FIG. 16. The method 1600 finds open and closed line objects within a given segmentation colour mask/layer. The method 1600 may be referred to as a vectorisation method. In the exemplary embodiment, the segmentation colour mask is represented as pixel runs for the processing, however alternative representations may be suitable.

The method 1600 begins at step 1610, where the processor 2505 selects a next line segment seed. A line segment seed is a short portion of a line object where the line object does not intersect with any other object and where the thickness and direction of the line object are substantially uniform. Line seed segments are typically found by analysing the vertical and/or horizontal slices of objects in a segmentation colour mask/layer to find objects which have a substantially uniform thickness and direction in a local region.

The method 1600 continues to step 1620, where the line segment seed is extended along both end points to fully determine the extents of the line object. Step 1620 is executed by analysing the vertical and/or horizontal slices of objects and the centre line and width on either side of the line segment seed in a segmentation colour mask/layer and verifying that their location and size match those of the line segment seed. As the line segment seed is extended, small deviations in the direction of the line object are allowed, and appropriate adjustments to the the direction of the line may be made to better reflect the true direction of the line object. The line extension process terminates when the direction or the size of the horizontal and/or vertical slices of the extended line differ substantially from those of the line segment seed. After detection of a line object is completed, the path (i.e., the center line) and width (i.e., the average thickness in the direction perpendicular to the centre line) of the line are determined and stored, an the detected line object is erased from the source image at the next step 1630 so as to avoid re-detection and possible interference with the detection of other line objects.

At the next step 1640, if there are more line segment seeds to be processed, then the method 1600 returns to step 1610. Otherwise, the method 1600 continues to step 1650. Steps 1610 to 1640 describe a preferred line vectorisation method. Other known vectorisation methods may be also used to detect the line objects.

The method 1600 continues at the next step 1650, where the method 1600 analyses the set of detected line objects and connects their end points where appropriate to form open and closed polygons. In the exemplary embodiment, the distance between the end points of line objects is determined and compared with a predetermined threshold distance. If the distance between the end points of line objects is less than the predetermined threshold distance then the end points are joined together. In the exemplary embodiment the predetermined threshold distance is determined based on twice the average line thickness.

At the next step 1660, the processor 2505 analyses the objects in the bitmap image after line object vectors have been removed in order to find line end styles that correspond to the open line ends. A method 2200 of determining line end styles for open line ends, as executed at step 1660, will be described in detail below with respect to FIG. 22.

Figure 17:
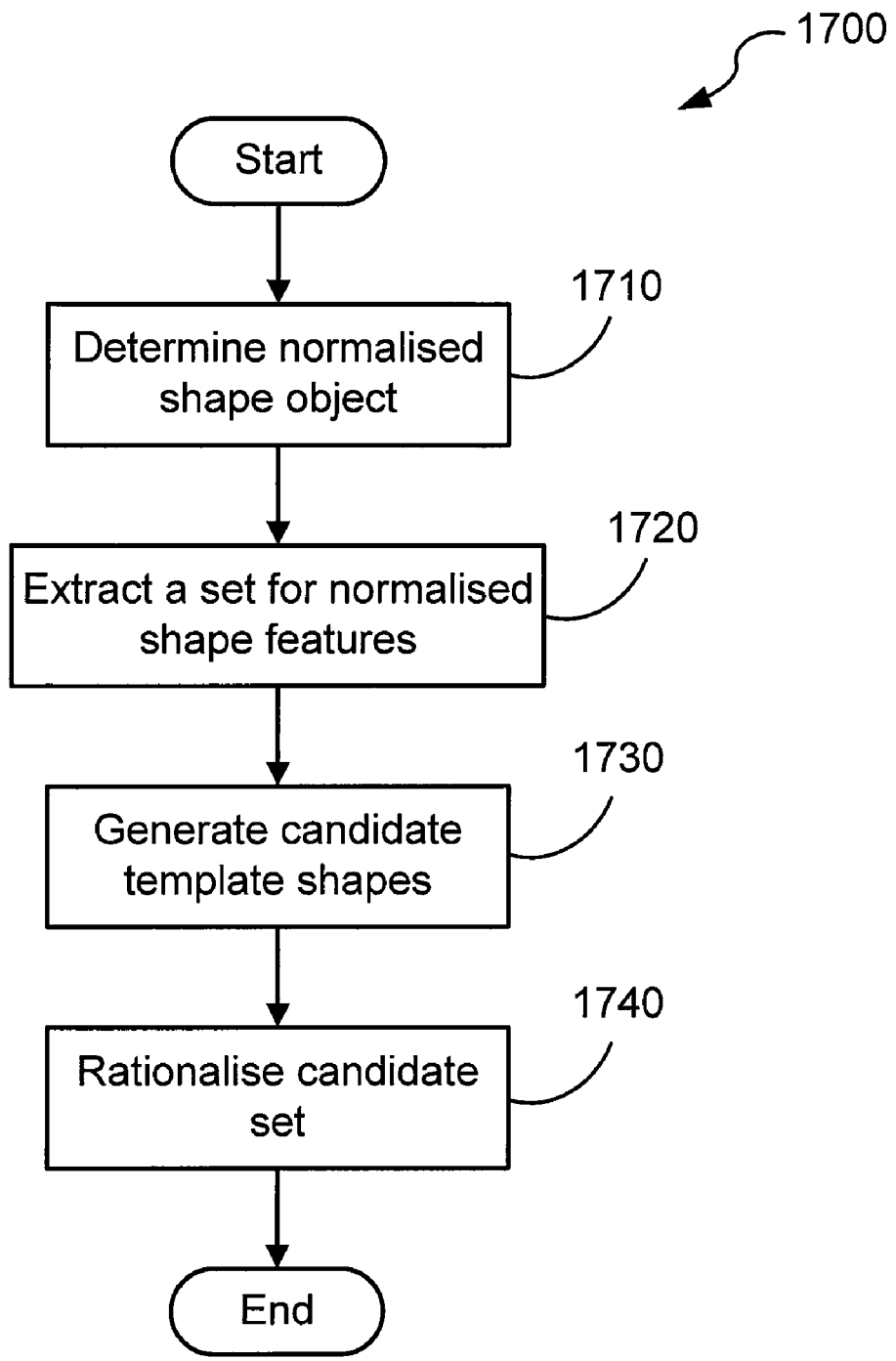
FIG. 17 is a flowchart showing a method of determining a set of candidate template shapes for a graphical object.

The method 1700 of determining a set of candidate template shapes for a graphical object, as executed at step 1320, will now be described with reference to FIG. 17. The method 1700 may be implemented as software resident on the hard disk drive 2510 and being controlled in its execution by the processor 2505.

The method 1700 begins at step 1710, where the processor 2505 determines a normalised shape object of a current graphical object. At step 1720 the processor 2505 extracts a set of normalised shape feature values from the normalised shape object. These feature values may be based on simple moments, Fourier descriptors, or simple radial distance functions.

Then at step 1730, a current normalised shape feature vector is analysed using a previously trained machine learning classifier to generate candidate template shapes. The classifier is preferably trained using the Support Vector Machine (SVM) algorithm. In alternate embodiments other machine learning algorithms may be implemented for training and classification. Examples of suitable machine learning algorithms may include artificial neural networks, k-nearest neighbour and decision tree.

Optionally, step 1730 of the method 1700 may be followed by step 1740 to improve the classification rates. Step 1740 uses a confusion matrix generated by the classifier to rationalise the set of candidate template shapes. The confusion matrix specifies the likelihood that a given template shape may be confused with (or misclassified as) another template shape. If a candidate template shape shares a high confusion likelihood with another template shape, then the latter template shape is also selected as a candidate template shape for further processing.

Figure 18:
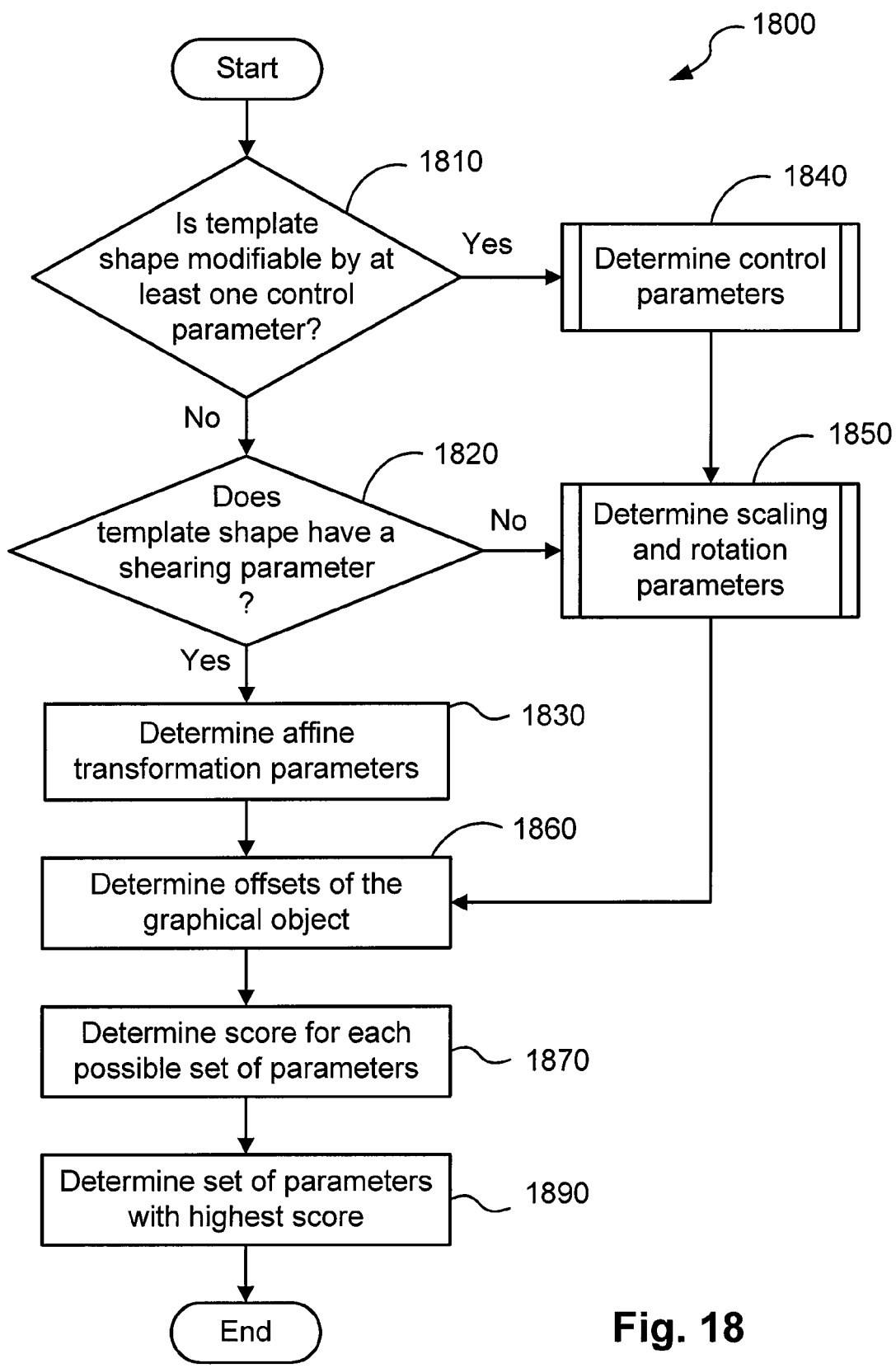
FIG. 18 is a flowchart showing a method of determining a set of parameters for modifying a candidate template shape to match a graphical object.

The method 1800 of determining a set of parameters for modifying a candidate template shape to match a graphical object, as executed at step 1340, will be described in more detail below with reference to FIG. 18. The method 1800 determines a set of transform parameters that optimally modifies the candidate template shape to match the graphical object. The transform parameters preferably consist of two scaling parameters $s_x$ and $s_y$, two offset parameters, $\Delta x$ and $\Delta y$, a rotation angle, and, depending on the graphical object, a line width and some additional control parameters. The line width is preferably set to the width of the line object if the graphical object is a line object, or zero otherwise. The method 1800 may be carried out using sets of features or descriptors of the graphical object and its normalised form such as moments. In the exemplary embodiment geometric, central geometric and Zernike moments of the normalised graphical object are used to estimate the template shape parameters.

At step 1810, if the processor 2505 determines that the template shape being matched is modifiable by at least one control parameter, then the method 1800 proceeds to step 1840. Otherwise, the method 1800 proceeds to step 1820. At step 1820, if the processor 2505 determines that the template shape has a shearing parameter, then the method 1800 proceeds to step 1830. Otherwise, the method 1800 proceeds to step 1850.

At step 1830, the processor 2505 determines the affine transform parameters for a template shape with a skew parameter by specifying a set of possible scaling, rotation and skew parameters for the graphical object. Preferably, at step 1830, a set of potential rotation parameters for the normalised template shape is determined, and then a matrix equation is solved in terms of the four unknown parameters that define the scaling in x- and y-axes ($s_x$ and $s_y$), the rotation ($\theta$) and the skew control parameter, c of the template shape respectively. If the normalised template shapes are rotationally symmetric and the order of symmetry of this normalised template shape is k, the set of possible normalised space rotation angles $\phi_n$ may be determined by comparing the Fourier phases of the normalised shape and a normalised template shape. The Fourier phase of a given shape is given by Equation 9:

$$\Phi(A) = \frac{\text{Arg}\left(\iint_A e^{-k(\cos\alpha + i\sin\alpha)} rd\,\alpha dr\right)}{k}, \quad (9)$$

where A is the area covered by the shape. The angles $\phi_n$ are then given by Equation 10:

$$\phi_n = \Phi(A') - \Phi(A_T') + 2\pi n/k \quad (10)$$

where A' is the area of the normalised shape, $A_T$' is the area of the normalised template shape, and n is an arbitrary integer in the range $\{0, \ldots, k-1\}$. If the normalised template shape is not symmetric then alternative rotation methods may be used such as those described below.

For each value of the angle $\phi_n$, the following matrix equation can be solved in terms of the four unknown parameters that define the scaling in x- and y-axes ($s_x$ and $s_y$), the rotation ($\theta$) and the skew control parameter, c in accordance with matrix Equation 11:

$$\begin{pmatrix} \sin\theta & -\cos\theta \\ \cos\theta & \sin\theta \end{pmatrix} \cdot \begin{pmatrix} s_x & 0 \\ 0 & s_y \end{pmatrix} \cdot \begin{pmatrix} 1 & c \\ 0 & 1 \end{pmatrix} = N^{-1} \cdot \begin{pmatrix} \sin\phi_n & -\cos\phi_n \\ \cos\phi_n & \sin\phi_n \end{pmatrix}, \quad (11)$$

where N is the affine normalisation matrix of the template shape. A set of k potential affine transform parameter sets corresponding to the k possible values of the angle $\phi_n$ are found. In the exemplary embodiment, solutions which are outside the valid range for the parameters are removed, while the rest are passed on to step 1860.

Parameter estimation for shapes with control parameters is performed in step 1840. A method 1900 of determining optimal control parameter values that transform a template shape to match a graphical object, as executed at step 1840, will be described in further detail with reference to FIG. 19.

At the next step 1850, a set of potential rotation and scaling parameters are determined for the template shape. A method 2400 of determining rotation and scaling parameters for use in modifying a template shape to match a graphical object, as executed at step 1850, will be described in detail below with reference to FIG. 24.

The method 1800 continues at the next step 1860 where the x- and y-offsets of the graphical object, ($\Delta x$, $\Delta y$), are determined for each set of estimated parameters from previous processing steps. In particular, at step 1860, the processor 2505 determines the centre of mass of the graphical object and shifts the template shape so that the centre of mass of the template shape is in the same location as the graphical object.

The method 1800 then continues to step 1870, at which a score for each possible set of parameters is determined. The score is a measure of how well the graphical object matches the template shape for the given set of parameters. In the exemplary embodiment, the score, f, is determined in accordance with Equation 11, as follows:

$$f = \frac{2A_{int}}{A_t + A_s}, \quad (11)$$

where $A_{int}$ is the area of intersection of the template shape and the graphical object, and $A_t$ and $A_s$ are the areas of the template shape and the graphical object, respectively. In alternative embodiments other distance metrics may be used such as the Hausdorff distance, and the average square distance between the boundaries.

The method 1800 concludes at the next step 1880, where the processor 2505 determines the set of parameters having the highest score.

Returning to step 1840, the best parameter set is determined to be the parameter set with the highest match score. This match score is then passed back for use in step 1360 for comparing the candidate template shape to the other candidate template shapes.

Figure 19:
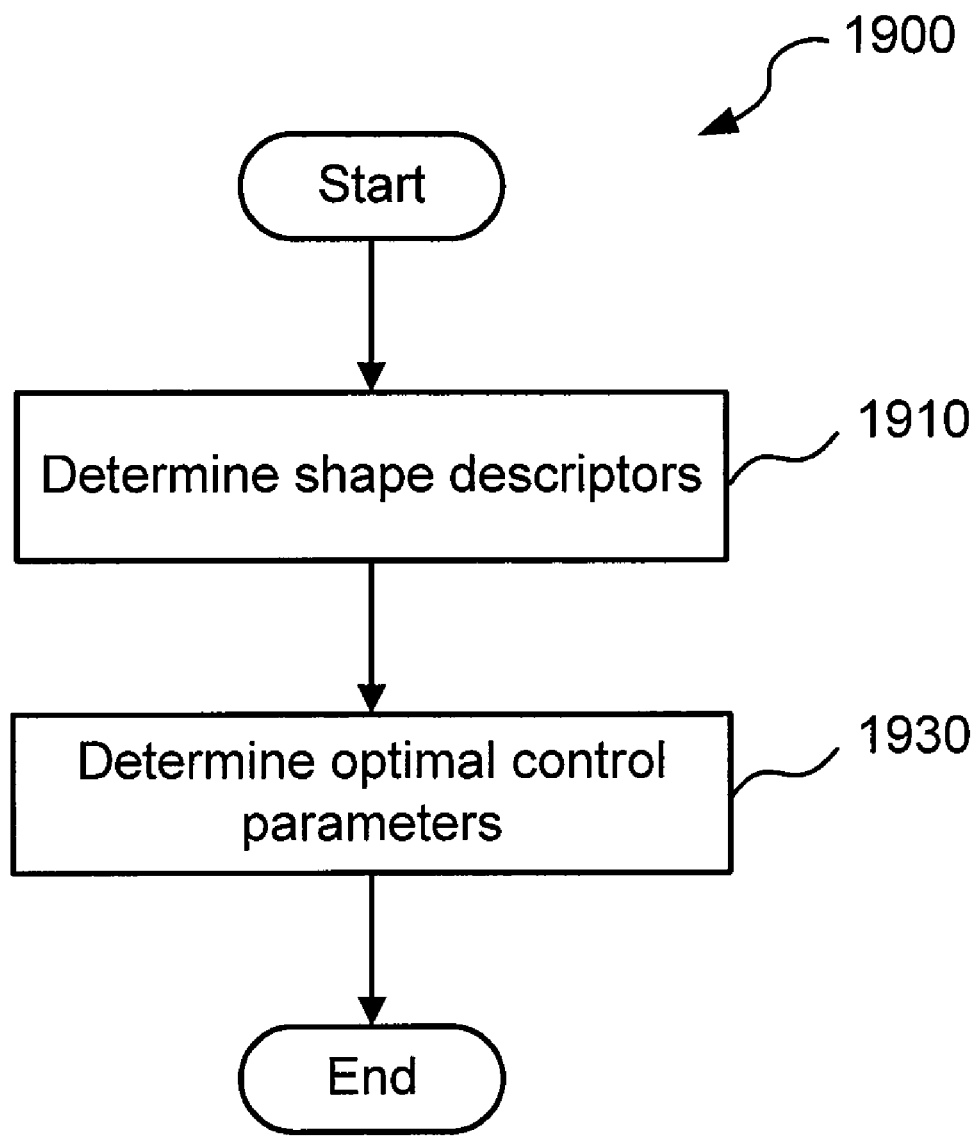
FIG. 19 is a flowchart showing a method of determining optimal control parameter values that transform a template shape to match a graphical object.

The method 1900 of determining optimal control parameter values that transform a template shape to match a graphical object, as executed at step 1840, will now be described in detail with reference to FIG. 19. The method 1900 may be implemented as resident on the hard disk drive 2510 and being controlled in its execution by the processor 2505.

The method 1900 begins at step 1910, where a set of descriptors is determined for the graphical object. This can be any set of shape features that can be represented as a function of the graphical object control parameters. In the exemplary embodiment, the Zernike moments of the graphical object are used, but other descriptors such as Fourier descriptors, central geometric moments, or more specific features such as the boundary length, or the location of identifiable features such as corners may be used, as well as any combination of different types of features.

In step 1920 the descriptors of the graphical object are compared with those of the template shape. A distance between the template shape descriptors for a given set of control parameters and the graphical object descriptors is defined. In the exemplary embodiment this distance is the sum of the squares of the differences between the graphical object descriptors and the corresponding template shape descriptors. The value of this distance measure is a function of the control parameters for the graphical object. If there are N control parameters then the distance measure defines an N-dimensional function. Estimates of the control parameters can be determined by finding the minima of this function, typically using function minimisation methods.

Figure 20:
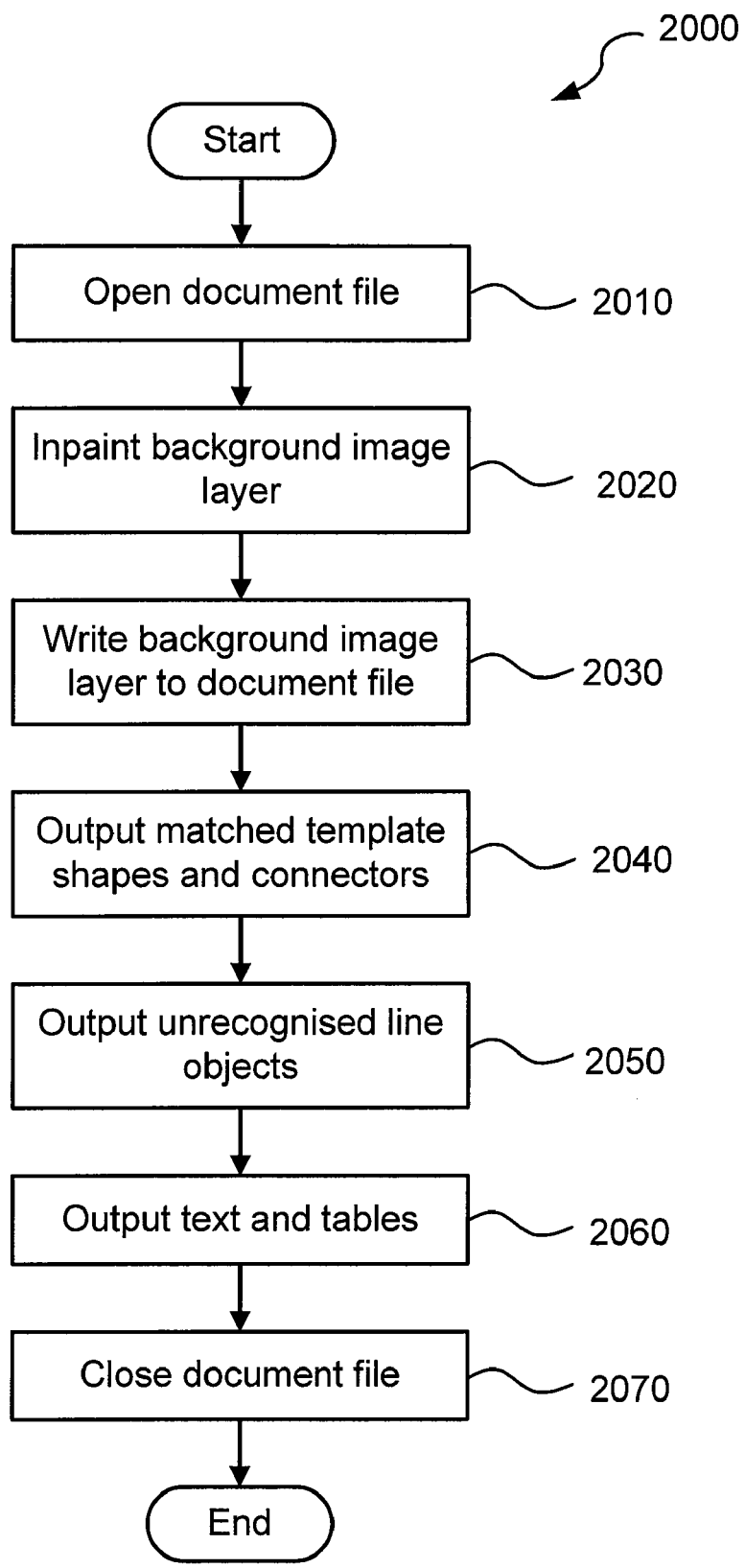
FIG. 20 is a flowchart showing a method of creating an editable document.

The method 2000 of creating an editable document comprising the matched closed-form non-textual template shapes and connectors (i.e., line objects that connect to and/or between template shapes within a document), and other document elements, as executed at step 1160, will now be described with reference to FIG. 20. The method 2000 may be implemented as software resident on the hard disk drive 2510 and being controlled in its execution by the processor 2505.

The method 2000 begins at the first step 2010, where the processor 2505 opens a document file in memory 2506 for writing and prepares the document file for entering the matched closed-form non-textual template shapes. At the next step 2020, the background image is inpainted. Inpainting removes the recognised text and shapes from the original image. Pixels which are part of a shape or recognised as text are replaced with the surrounding background colour. At the next step 2030, this inpainted background image is optionally written to the document file, to serve as the background of the document. This ensures any objects not recognised, which may include things such as photographic images, are still visible in the document. In step 2040, the matched template shapes and classified straight and elbow connectors are written to the document file with the corresponding parameters. The connectors are output as connecting to the template shapes they have been recognised as connecting to. At step 2050, any remaining line objects are output as lines to the document file. Then at the next step 2060, the text and tables recognised earlier are added to the document file. The method 2000 concludes at the next step 2070 where the document is complete and the document file is closed.

Figure 21:
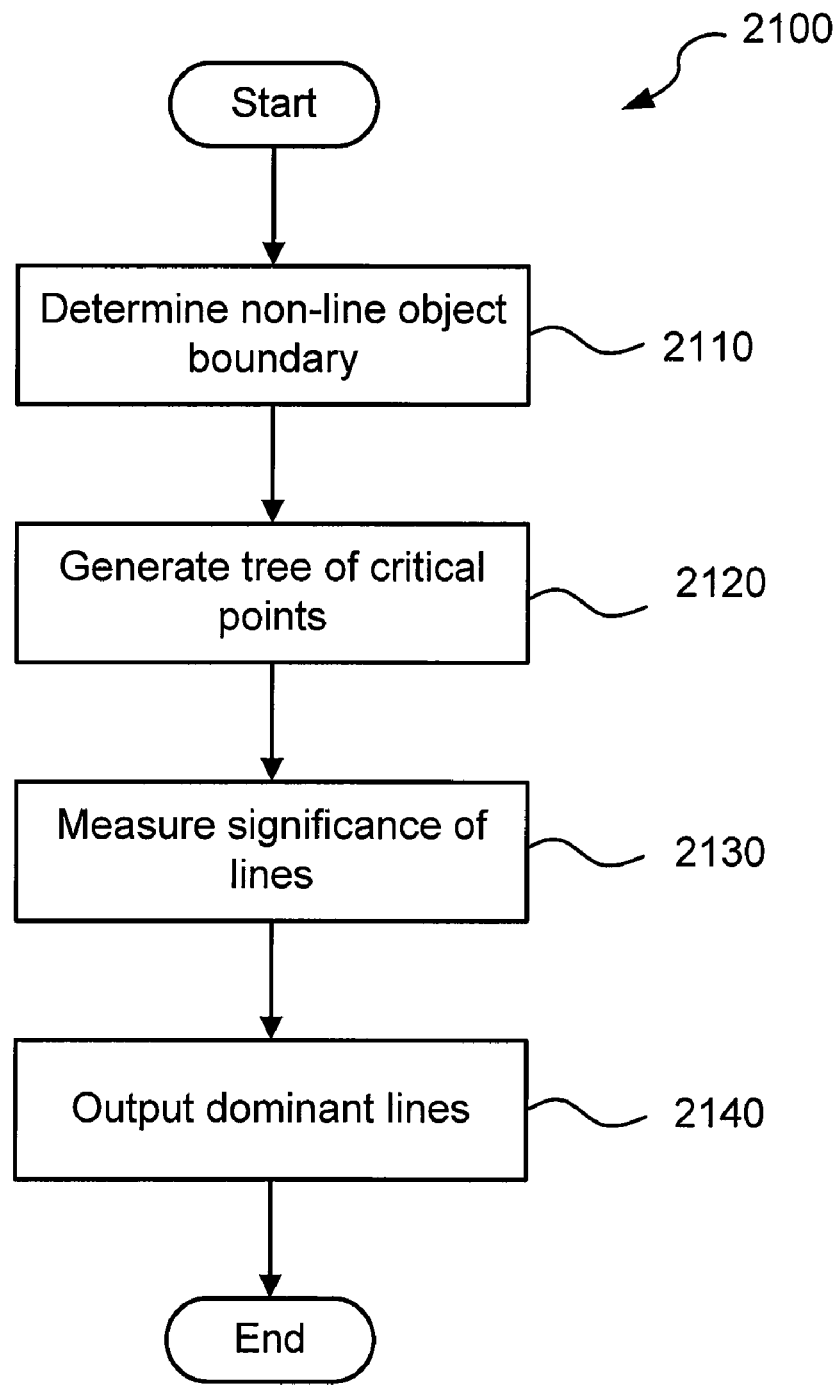
FIG. 21 is a flowchart showing a method of extracting non-line objects.

The method 2100 of extracting non-line objects from a colour layer, as executed at step 1230, will now be described with reference to FIG. 21. The method 2100 may be implemented as software resident on the hard disk drive 2510 and being controlled in its execution by the processor 2505.

The method 2100 begins at the first step 2110, where the outside boundary of the non-line object to be extracted is determined. Step 2110 may be performed by starting at a point of the object known to be on the boundary of the object, such as the first object pixel in raster order. Then the boundary of the non-line object is followed by moving from each boundary pixel to the next eight (8)-connected pixel in a clockwise fashion. Once the starting point is reached again the outside boundary of the non-line object is complete.

At the next step 2120, a tree of critical points is generated for the non-line object to be extracted. First a pair of starting points is found. The first starting point is the furthest point from the centre of the non-line object to be extracted, and the second is the furthest point on the boundary of the non-line object from the first point. This defines a simple polygon of two lines, one starting at the first point and ending at the second, and the other starting at the second point and ending at the first. Each line represents a summary of a section of the boundary of the non-line object to be extracted, where the section of boundary is made up of the boundary points found by moving between the start and the end of the line in a clockwise direction. Each line is then recursively split into two more lines, until a minimum line length is reached. In one embodiment the minimum line length is four (4) pixels. The splitting point used in the recursive splitting operation is the furthest point from the line on the section of boundary that line represents. Both end points of each line are therefore on the boundary of the non-line object, and each line represents a section of the boundary of the non-line object to be extracted. All of the lines formed during step 2120 are stored in memory 2506 and are represented in a tree structure, where each line is a parent of the two lines that the line is split into.

At the next step 2130 a measure of significance is given to each line in the tree. In one embodiment the significance is defined as the length of the line divided by the distance of the furthest point on the section of the boundary of the object that line represents from the line. In one embodiment, the distance of the furthest point is increased to a minimum value if the distance is too low. In one embodiment this minimum value is a distance of one (1) pixel.

The method 2100 concludes at the next step 2140, where the dominant lines are written to a list configured within memory 2506. The dominant lines are those which have a higher significance than all the lines underneath them in the tree. An ordered set of dominant lines is formed which represents the entire boundary of the object in the form of a polygon, and so the polygon creation step 1230 is complete.

Figure 22:
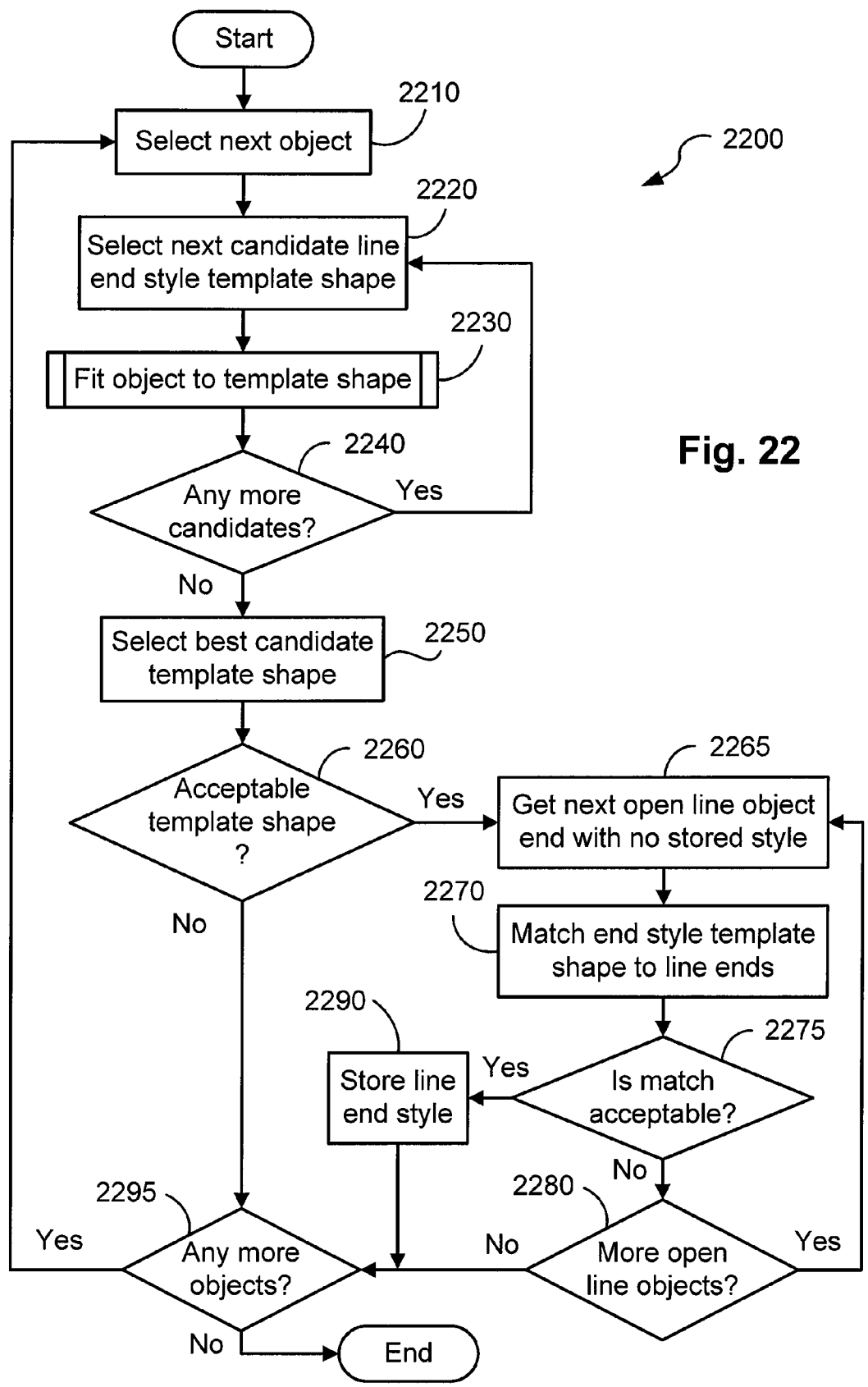
FIG. 22 is a flowchart showing a method of determining line end styles for open line ends.
Figure 23:
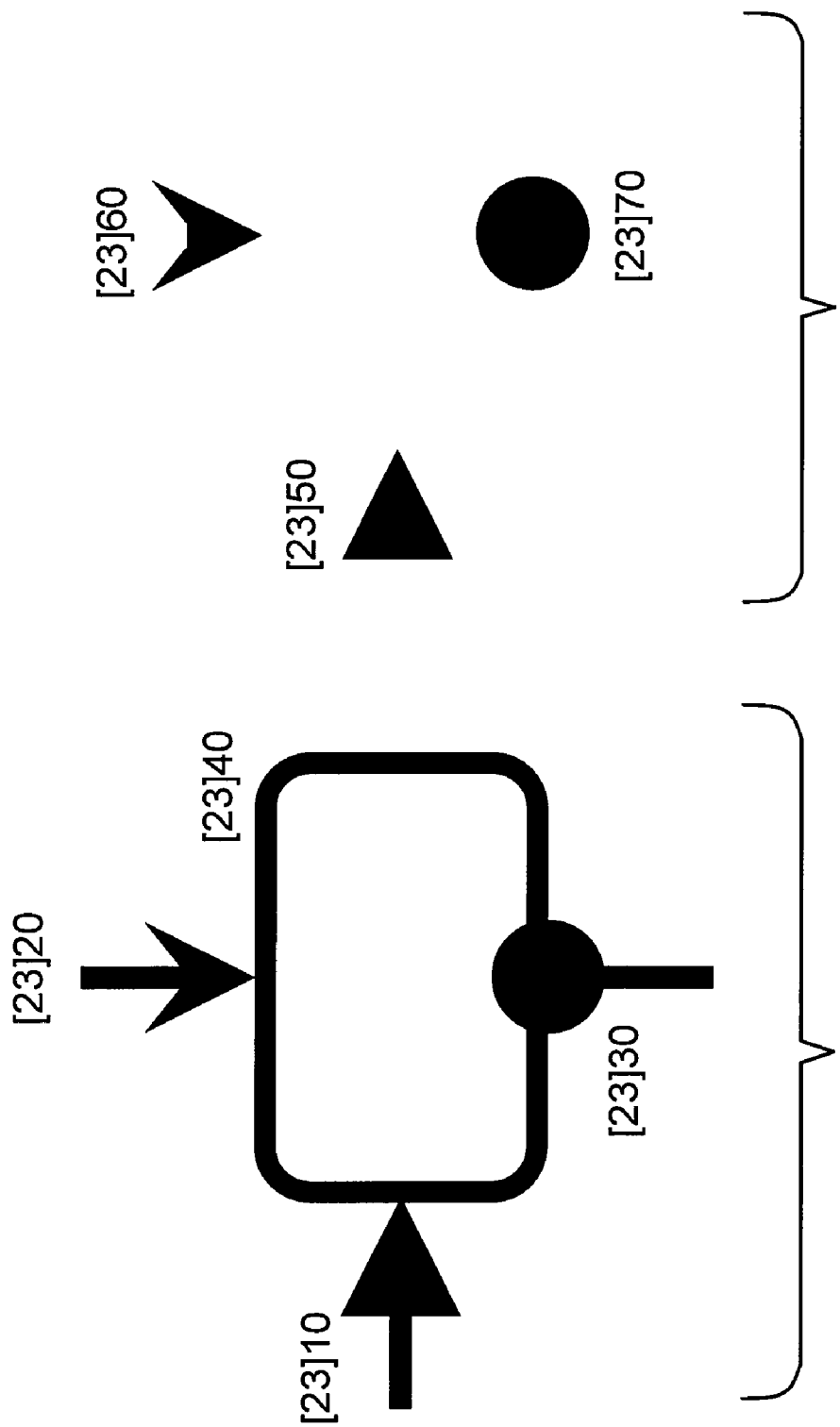
FIG. 23(a) shows an example of a bitmap before vectorisation.
FIG. 23(b) shows an example of a bitmap after vectorisation.

The method 2200 of determining line end styles for open line ends, as executed at step 1660, will be described in detail below with respect to FIG. 22. In the method 2200 the objects in the bitmap are analysed after line object vectors have been removed in order to find line end styles that correspond to the open line ends. An illustrative example of a bitmap before vectorisation is shown in FIG. 23(a), and after vectorisation is shown in 23(b). As seen in FIG. 23(a), prior to vectorisation the image includes three (3) line objects with line end styles 2310 with a standard arrow, 2320 with a sleek arrow, and 2330 with a circular end style attached to a round rectangle line object 2340. As seen in FIG. 23(b), after vectorisation, the line components of these line objects are removed to leave residual shape objects corresponding to the original three line end styles 2350 to 2370. In general, these residual shapes can be considered as objects of simple template shapes with no nonlinear control parameters. For example, the head of the standard arrow 2320 (i.e., the standard arrow head) can be matched to an isosceles triangle, while the circular arrow head could be matched to a circular template.

The method 2200 processes the residual bitmap to determine line end styles. The method 2200 begins at step 2210, where the next object on the bitmap is selected. Then at the step 2220, the processor 2505 selects the next candidate line end style template shape and then at step 2230 fits the current object to the current template shape in accordance with the method 1800 as described above.

At the next step 2240, if more candidate line end style template shapes exist, then the method 2200 returns to step 2220. Otherwise, the method 2200 continues at step 2250.

At step 2250, the best candidate template shape is selected, and this template shape is compared to a threshold at step 2260 to determine whether the best candidate template shape is acceptable. Preferably, this threshold is a 90% fitness score (i.e. f>0.9). If the template shape is acceptable, the method 2200 continues to step 2265. Otherwise, the method 2200 continues directly to step 2295.

At step 2265, the next open line object which currently has no stored line end style on at least one end is selected. Then at step 2270, the fitted line end style template shape is matched to the ends of the current line object that does not yet have a line end style. At the next step 2275, if the match between the current end style template shape and the current line end is acceptable, then the method 2200 proceeds to step 2290. Otherwise, the method 2200 proceeds to step 2280. The match is deemed acceptable if the line end point is located within a threshold distance to the fitted template shape, the distance from the line end point to the centroid of the fitted template shape projected along the local perpendicular to the line at the line end point is below a second threshold, and the absolute value of the difference in angle between the template shape fit orientation and the angle of the line at the line end point is below a third threshold. Preferably these three thresholds are given by twice the line width, half the line width and ten (10) degrees, respectively.

At step 2290, the processor 2505 stores the line end style and marks the current bitmap object as matched, and then the method 2200 continues to step 2295. Otherwise, if the match is not acceptable then the method 2200 continues to step 2280. From step 2280, the method 2200 returns to step 2265 if there are more open lines with at least one end without a stored style. Otherwise, the method 2200 continues to step 2295. From step 2295, the method 2200 returns to step 2210 if there are more objects to be processed. Otherwise, the line end style method 2200 concludes.

Figure 24:
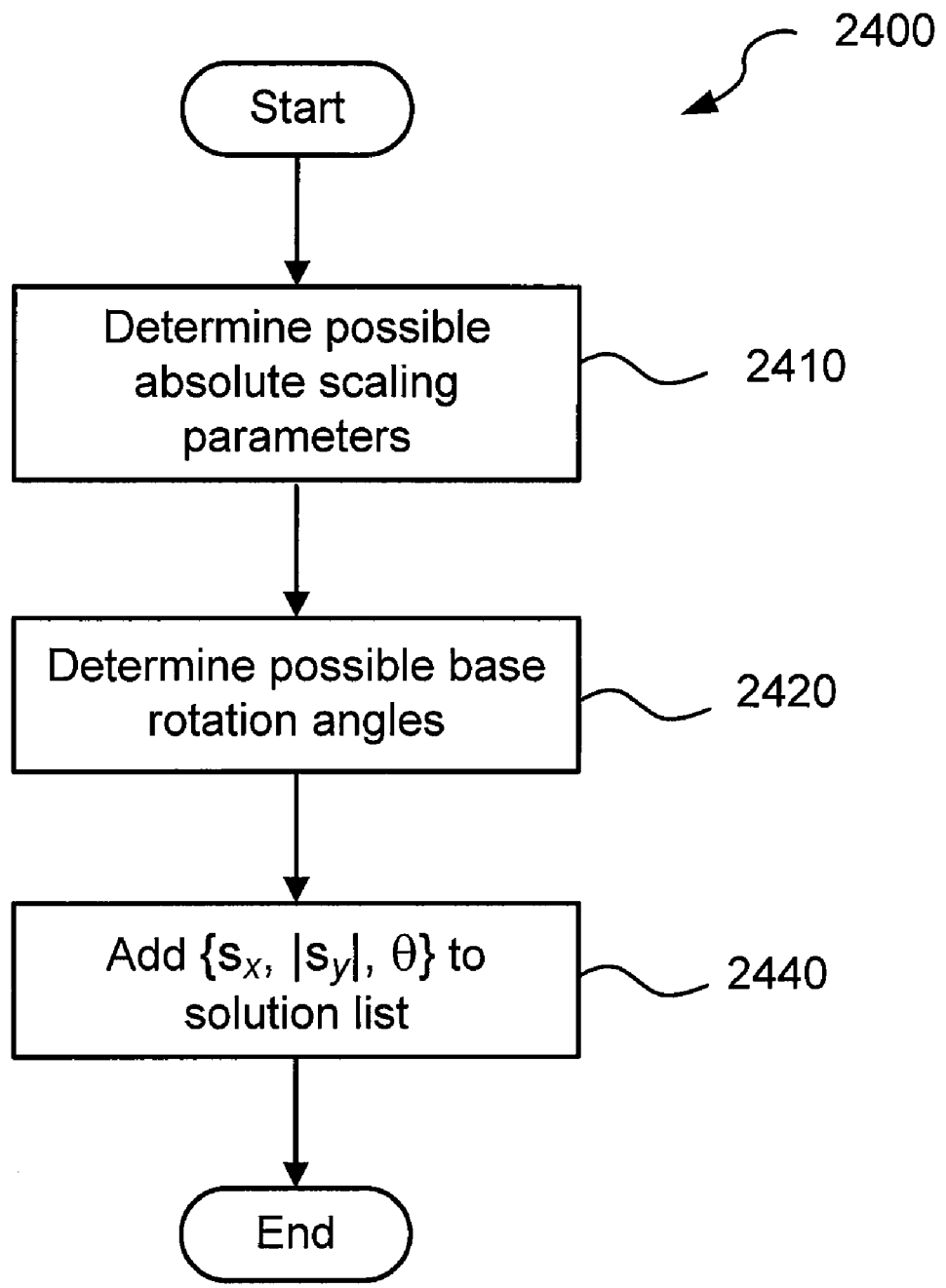
FIG. 24 is a flowchart showing a method of determining rotation and scaling parameters for use in modifying a template shape to match a graphical object.

The method 2400 of determining rotation and scaling parameters for use in modifying a template shape to match a graphical object, as executed at step 1850, will now be described with reference to FIG. 24. The method 2400 estimates the scaling parameters ($s_x$ and $s_y$) and rotation, $\theta$, in more detail. These parameters may be estimated using sets of features of a current graphical object. In the exemplary embodiment, the scaling parameters are estimated using combinations of central geometric moments that are invariant to rotation. Let $\{m_{00}, m_{20}, m_{02}\}$ and $\{\overline{m}_{00}, \overline{m}_{20}, \overline{m}_{02}\}$ denote the sets of central geometric moments of the untransformed shape template and graphical object, respectively. The scaling parameters, denoted by $s_x$ and $s_y$, are determined in accordance with Equations 12 and 13:

$$\overline{m}_{00} = |s_x s_y| m_{00} \tag{12}$$

$$\overline{m}_{20} + \overline{m}_{02} = |s_x s_y|(s_x^2 m_{20} + s_y^2 m_{02}) \tag{13}$$

At step 2410, two pairs of solutions for the absolute values of the scaling parameters that satisfy the Equations (12) and (13), are determined in accordance with Equations 15, 16, 17 and 18:

$$|s_x|_1 = \frac{\sqrt{\overline{m}_{20} + \overline{m}_{02} + \sqrt{(\overline{m}_{20} + \overline{m}_{02})^2 - 4K^4 m_{20} m_{02}}}}{2K m_{20}}, \tag{15}$$

$$|s_y|_1 = \frac{K}{|s_x|_1}, \tag{16}$$

$$|s_x|_2 = \frac{\sqrt{\overline{m}_{20} + \overline{m}_{02} - \sqrt{(\overline{m}_{20} + \overline{m}_{02})^2 - 4K^4 m_{20} m_{02}}}}{2K m_{20}}, \tag{17}$$

$$|s_y|_2 = \frac{K}{|s_x|_2}, \tag{18}$$

where $K = \frac{\overline{m}_{00}}{m_{00}}$.

Once the two pairs of solutions are found for the scaling parameters, at the next step 2420 the processor 2505 determines values for the rotation angle.

In the exemplary embodiment, fourth order Zernike moments are used to determine the base rotation angles. Zernike moments are complex (comprising a real part and an imaginary part) shape descriptors which may be used for shape detection. Fourth order Zernike moments may be expressed in terms of zeroth, second and fourth order central geometric moments in accordance with Equations 19 and 20:

$$z_{44} = \frac{5}{\pi}[(m_{40} - 6m_{22} + m_{04}) + 4i(m_{13} - m_{31})] \tag{19}$$

$$z_{42} = \frac{5}{\pi}[(4m_{40} - 4m_{04} - 3m_{20} + 3m_{02}) + 2i(3m_{11} - 4m_{13} - 4m_{31})] \tag{20}$$

where $i = \sqrt{-1}$.

Let $m_{pq}$ denote the central geometric moments of the untransformed template shape, let $m'_{pq}$ denote those of the template shape after scaling along the x- and y-axis by $s_x$ and $s_y$ respectively, and let $\overline{m}_{pq}$ denote those of the graphical object. Similarly let $z'_{4n}$ and $\overline{z}_{4n}$, n=2, 4, denote the fourth order Zernike moments of the scaled template shape and the graphical object respectively.

In the exemplary embodiment, the rotation angles used are the roots of Equation 21:

$$a_0 + a_1 \cos 2\theta + a_2 \cos^2 2\theta + a_3 \cos^3 2\theta + a_4 \cos^4 2\theta \tag{21}$$

where $a_0 = A^2 - C^2$ $a_1 = 2(AB - CD)$ $a_2 = B^2 + C^2 - D^2 + 2AE$ $a_3 = 2(CD + BE)$ $a_4 = D^2 + E^2$ $A = -8(-z'_{44i}\overline{z}_{44r} + z'_{44r}\overline{z}_{44i})$ $B = 4(z'_{42r}\overline{z}_{42i} - z'_{42i}\overline{z}_{42r})$ $E = -2A$ $C = 4(z'_{42r}\overline{z}_{42i} + z'_{42i}\overline{z}_{42r})$ $D = 16(z'_{44r}\overline{z}_{44i} + z'_{44i}\overline{z}_{44r})$ and $$z'_{4nr} = Re[z'_{4n}]$$

$$z'_{4ni} = Im[z'_{4n}]$$

$$\bar{z}_{4nr} = Re[\bar{z}_{4n}]$$

$$\bar{z}_{4ni} = Im[\bar{z}_{4n}]$$

Equation 21 may be derived by finding the local minima of Equation 22:

$$\text{err} = \|z'_{44} - \bar{z}_{44}\|^2 + \|z'_{42} - \bar{z}_{42}\|^2 \quad (22)$$

using the relationship between the moments of a shape and the rotation of the shape in accordance with Equations 23, 24, 25 and 26:

$$m'_{pq} = |s_x s_y| s_x^p s_y^q m_{pq} \quad (23)$$

$$\bar{m}_{00} = m'_{00} \quad (24)$$

$$\begin{pmatrix} \bar{m}_{20} \\ \bar{m}_{11} \\ \bar{m}_{02} \end{pmatrix} = \begin{pmatrix} c^2 & -2cs & s^2 \\ cs & c^2-s^2 & -cs \\ s^2 & 2cs & c^2 \end{pmatrix} \begin{pmatrix} m'_{20} \\ m'_{11} \\ m'_{02} \end{pmatrix} \quad (25)$$

$$\begin{pmatrix} \bar{m}_{40} \\ \bar{m}_{31} \\ \bar{m}_{22} \\ \bar{m}_{13} \\ \bar{m}_{04} \end{pmatrix} = \quad (26)$$

$$\begin{pmatrix} c^4 & -4c^3s & 6c^2s^2 & -4cs^3 & s^4 \\ c^3s & c^2(c^2-3s^2) & -3cs(c^2-s^2) & s^2(3c^2-s^2) & -cs^3 \\ c^2s^2 & 2cs(c^2-s^2) & 1-6c^2s^2 & -2cs(c^2-s^2) & c^2s^2 \\ cs^3 & s^2(3c^2-s^2) & 3cs(c^2-s^2) & c^2(c^2-3s^2) & -c^3s \\ s^4 & 4cs^3 & 6c^2s^2 & 4c^3s & c^4 \end{pmatrix} \begin{pmatrix} m'_{40} \\ m'_{31} \\ m'_{22} \\ m'_{13} \\ m'_{04} \end{pmatrix}$$

where $c = \cos\theta$ and $s = \sin\theta$.

The solutions of Equation 21 give base rotation angles for $\theta$ for each of the solutions for the absolute values of the scaling parameters. For each value of $\theta$ there are then up to four solutions added corresponding to the four solutions for the signed scaling parameters:

$$\{s_x, s_y\}, \{s_x, -s_y\}, \{-s_x, s_y\}, \{-s_x, -s_y\}.$$

Noting that taking the negative of both $s_x$ and $s_y$ is the same as a one-hundred and eighty (180) degree rotation, the options may be written as $$\{|s_x|, |s_y|, \theta\},$$

$$\{|s_x|, |s_y|, \theta+\pi\},$$

$$\{|s_x|, -|s_y|, \theta\},$$

$$\{|s_x|, -|s_y|, \theta+\pi\}.$$

For template shapes with x or y symmetry, the negatives of $s_x$ and $s_y$ have no effect on the template shape so those possibilities may be ignored. Also, template shapes with one-hundred and eighty (180) degree rotational symmetry do not need to consider the rotated possibilities. Template shapes with both sorts of symmetry only need one solution possibility for each base angle.

The method 2400 concludes at the next step 2430, where all of the solutions for each value of $\theta$, as described above, are added to a list. The best solution will be decided in step 1870 based on the fit scores.

The template shapes used in the described methods may be one of the template shapes defined by the Microsoft® AutoShape application. The template shapes may also be one of the template shapes defined by the OpenOffice.org editing applications such as Writer™ and Impress™. Further, the template shapes may also be one of the template shapes defined by the VISIO® editing application. Still further, the template shapes may also be one of the template shapes defined by the SmartDraw® editing application developed by SmartDraw.com.

INDUSTRIAL APPLICABILITY

It is apparent from the above that the arrangements described are applicable to the computer and data processing industries).

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

TABLE 1

| SHAPE NAME | REFERENCE |
|---|---|
| Rectangle | 27001 |
| Round Rectangle | 27002 |
| Ellipse | 27003 |
| Diamond | 27004 |
| Isosceles Triangle | 27005 |
| Right Triangle | 27006 |
| Parallelogram | 27007 |
| Trapezoid | 27008 |
| Hexagon | 27009 |
| Octagon | 27010 |
| Plus Sign | 27011 |
| Star | 27012 |
| Arrow | 27013 |
| Thick Arrow | 27014 |
| Home Plate | 27015 |
| Balloon | 27016 |
| Seal | 27017 |
| Plaque | 27018 |
| Chevron | 27019 |
| Pentagon | 27020 |
| Seal8 | 27021 |
| Seal16 | 27022 |
| Seal32 | 27023 |
| Wedge Rectangle Callout | 27024 |
| Wedge Rrect Callout | 27025 |
| Wedge Ellipse Callout | 27026 |
| Wave | 27027 |
| Left Arrow | 27028 |
| Down Arrow | 27029 |
| Up Arrow | 27030 |
| Left Right Arrow | 27031 |
| Up Down Arrow | 27032 |
| Irregularseal1 | 27033 |
| Irregularseal2 | 27034 |
| Lightning Bolt | 27035 |
| Heart | 27036 |
| Quad Arrow | 27037 |
| Left Arrow Callout | 27038 |
| Right Arrow Callout | 27039 |

TABLE 1-continued

| SHAPE NAME | REFERENCE |
| --- | --- |
| Up Arrow Callout | 27040 |
| Down Arrow Callout | 27041 |
| Left Right Arrow Callout | 27042 |
| Up Down Arrow Callout | 27043 |
| Quad Arrow Callout | 27044 |
| Left Up Arrow | 27045 |
| Bent Up Arrow | 27046 |
| Bent Arrow | 27047 |
| Seal24 | 27048 |
| Notched Right Arrow | 27049 |
| Block Arc | 27050 |
| Circular Arrow | 27051 |
| U Turn Arrow | 27052 |
| Flow Chart Process | 27053 |
| Flow Chart Decision | 27054 |
| Flow Chart Input Output | 27055 |
| Flow Chart Document | 27056 |
| Flow Chart Terminator | 27057 |
| Flow Chart Preparation | 27058 |
| Flow Chart Manual Input | 27059 |
| Flow Chart Manual Operation | 27060 |
| Flow Chart Connector | 27061 |
| Flow Chart Punched Card | 27062 |
| Flow Chart Punched Tape | 27063 |
| Flow Chart Extract | 27064 |
| Flow Chart Merge | 27065 |
| Flow Chart Online Storage | 27066 |
| Flow Chart Magnetic Tape | 27067 |
| Flow Chart Display | 27068 |
| Flow Chart Delay | 27069 |
| Flow Chart Alternate Process | 27070 |
| Flow Chart Off Page Connector | 27071 |
| Left Right Up Arrow | 27072 |
| Moon | 27073 |
| Seal4 | 27074 |
| Double Wave | 27075 |
| Cube | 27076 |
| Can | 27077 |
| Donut | 27078 |
| Ribbon | 27079 |
| Ribbon2 | 27080 |
| No Smoking | 27081 |
| Folded Corner | 27082 |
| Bevel | 27083 |
| Striped Right Arrow | 27084 |
| Vertical Scroll | 27085 |
| Horizontal Scroll | 27086 |
| Curved Right Arrow | 27087 |
| Curved Left Arrow | 27088 |
| Curved Up Arrow | 27089 |
| Curved Down Arrow | 27090 |
| Cloud Callout | 27091 |
| Ellipse Ribbon | 27092 |
| Ellipse Ribbon 2 | 27093 |
| Flow Chart Predefined Process | 27094 |
| Flow Chart Internal Storage | 27095 |
| Flow Chart Multidocument | 27096 |
| Flow Chart Summing Junction | 27097 |
| Flow Chart Or | 27098 |
| Flow Chart Collate | 27099 |
| Flow Chart Sort | 27100 |
| Flow Chart Offline Storage | 27101 |
| Flow Chart Magnetic Disk | 27102 |
| Flow Chart Magnetic Drum | 27103 |
| Sun | 27104 |

The claims defining the invention are as follows:

1. A method of creating a document comprising a modifiable shape, the method comprising the steps of:
   analysing an image to detect at least a graphical object;
   matching the detected graphical object with at least one of a plurality of predetermined modifiable closed-form non-textual template shapes, each said predetermined template shape comprising at least one control parameter for modifying the closed-form non-textual template shape in a non-affine manner, wherein the number of control parameters of the predetermined modifiable closed-form non-textual template shape is less than a number of sections making up the modifiable closed-form non-textual template shape; and
   creating a document comprising the at least one modifiable closed-form non-textual template shape.

2. The method according to claim 1, wherein said at least one of the plurality of template shapes is a set of candidate template shapes selected from a set of template shapes.

3. The method according to claim 2, wherein the candidate template shapes are selected using a machine learning classifier.

4. The method according to claim 1, the matching step comprises the sub-steps of:
   estimating an optimal set of control parameters;
   estimating an optimal set of affine parameters based on said graphical object and said estimated control parameters; and
   computing a match score between said graphical object and said template shape wherein said template shape uses said estimated affine parameters and said control parameters.

5. The method according to claim 1, wherein the image is a bitmap image.

6. The method according to claim 1, further comprising the step of modifying the at least one modifiable closed-form non-textual template shape to match said graphical object.

7. The method according to claim 1, wherein each of the template shapes comprises at most four control parameters.

8. The method according to claim 1, wherein each of the template shapes comprises line thickness parameters.

9. The method according to claim 1, wherein the template shape is one of the Microsoft® AutoShapes.

10. The method as recited in claim 1, wherein the template shape is one of the template shapes defined by the OpenOffice™ application.

11. The method as recited in claim 1, wherein the template shape is one of the template shapes defined by the VISIO® application.

12. The method as recited in claim 1, wherein the template shape is one of the template shapes defined by the SmartDraw® application.

13. The method according to claim 1, wherein each of the template shapes further comprises affine parameters.

14. The method according to claim 13, wherein the affine parameters define modifications to the template shape.

15. The method according to claim 14, wherein the modifications are described by a linear matrix transform.

16. The method according to claim 15, wherein the modifications include scaling.

17. The method according to claim 15, wherein the modifications include rotation.

18. The method according to claim 15, wherein the modifications include offset.

19. The method according to claim 15, wherein the modifications include skew.

20. An apparatus for creating a document comprising a modifiable shape, the apparatus comprising:
   analysing means for analysing an image to detect at least a graphical object;
   matching means for matching the detected graphical object with at least one of a plurality of predetermined modifiable closed-form non-textual template shapes, each said predetermined template shape comprising at least one control parameter for modifying the closed-form non-textual template shape in a non-affine manner, wherein the number of control parameters of the at least one modifiable closed-form non-textual template shape is less than a number of sections making up the at least one modifiable closed-form non-textual template shape; and creation means for creating a document comprising the at least one modifiable closed-form non-textual template shape.

21. A non-transitory computer readable medium, having a program recorded thereon, where the program is configured to make a computer execute a procedure to create a document comprising a modifiable shape, the program comprising:

code for analysing an image to detect at least a graphical object;

code for matching the detected graphical object with at least one of a plurality of predetermined modifiable closed-form non-textual template shape, each said predetermined template shape comprising at least one control parameter for modifying the closed-form non-textual template shape in a non-affine manner, wherein the number of control parameters of the at least one modifiable closed-form non-textual template shape is less than a number of sections making up the at least one modifiable closed-form non-textual template shape; and code for creating a document comprising the at least one modifiable closed-form non-textual template shape.

22. A system for creating a document comprising a modifiable shape, the system comprising:

a memory for storing data and a computer program;

a processor coupled to said memory for executing said computer program, said computer program comprising instructions for:

analysing an image to detect at least a graphical object;

matching the detected graphical object with at least one of a plurality of predetermined modifiable closed-form non-textual template shapes, each predetermined template shape comprising at least one control parameter for modifying the closed-form non-textual template shape in a non-affine manner, wherein the number of control parameters of the predetermined modifiable closed-form non-textual template shape is less than a number of sections making up the modifiable closed-form nontextual template shape; and creating a document comprising at least one modifiable closed-form non-textual template shape.

\* \* \* \* \*